March 9, 1943.  H. S. BENJAMIN  2,313,505
APPARATUS FOR CONTROLLING THE CONDITION
OF OPERATION OF VEHICLES OR THE LIKE
Filed April 16, 1940  9 Sheets-Sheet 1
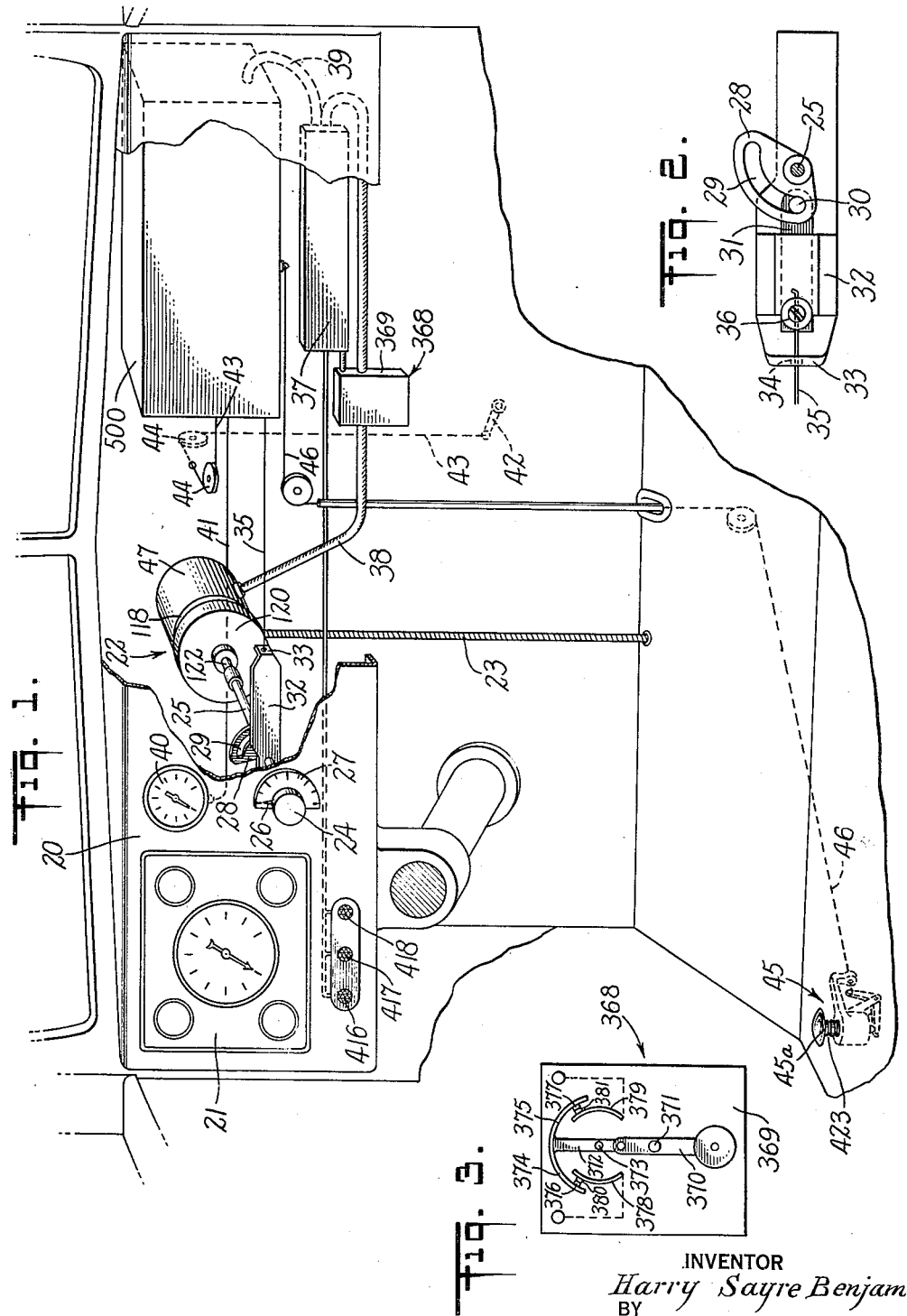
INVENTOR
*Harry Sayre Benjamin*
BY
*Blair, Curtis & Hayward*
ATTORNEYS

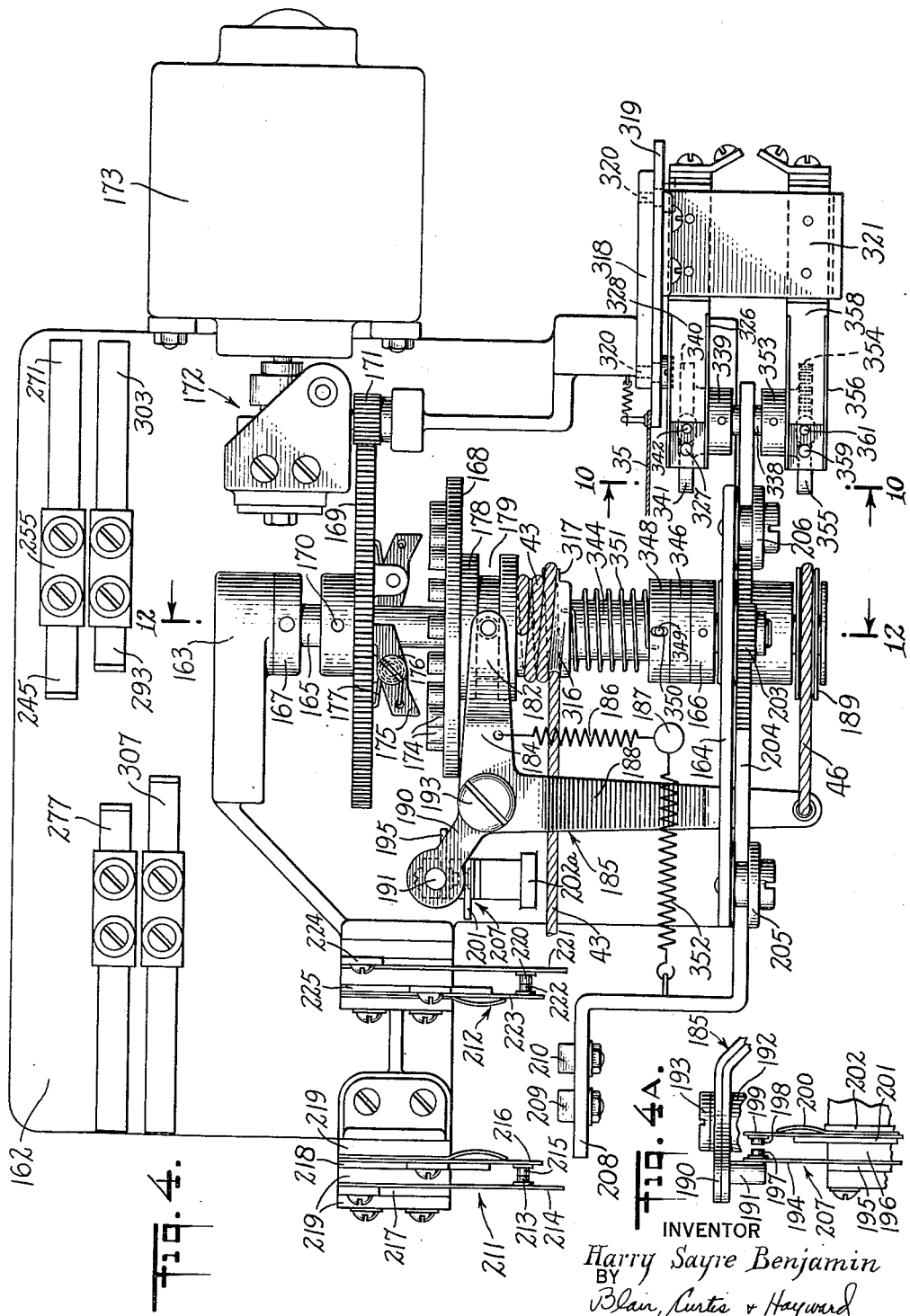

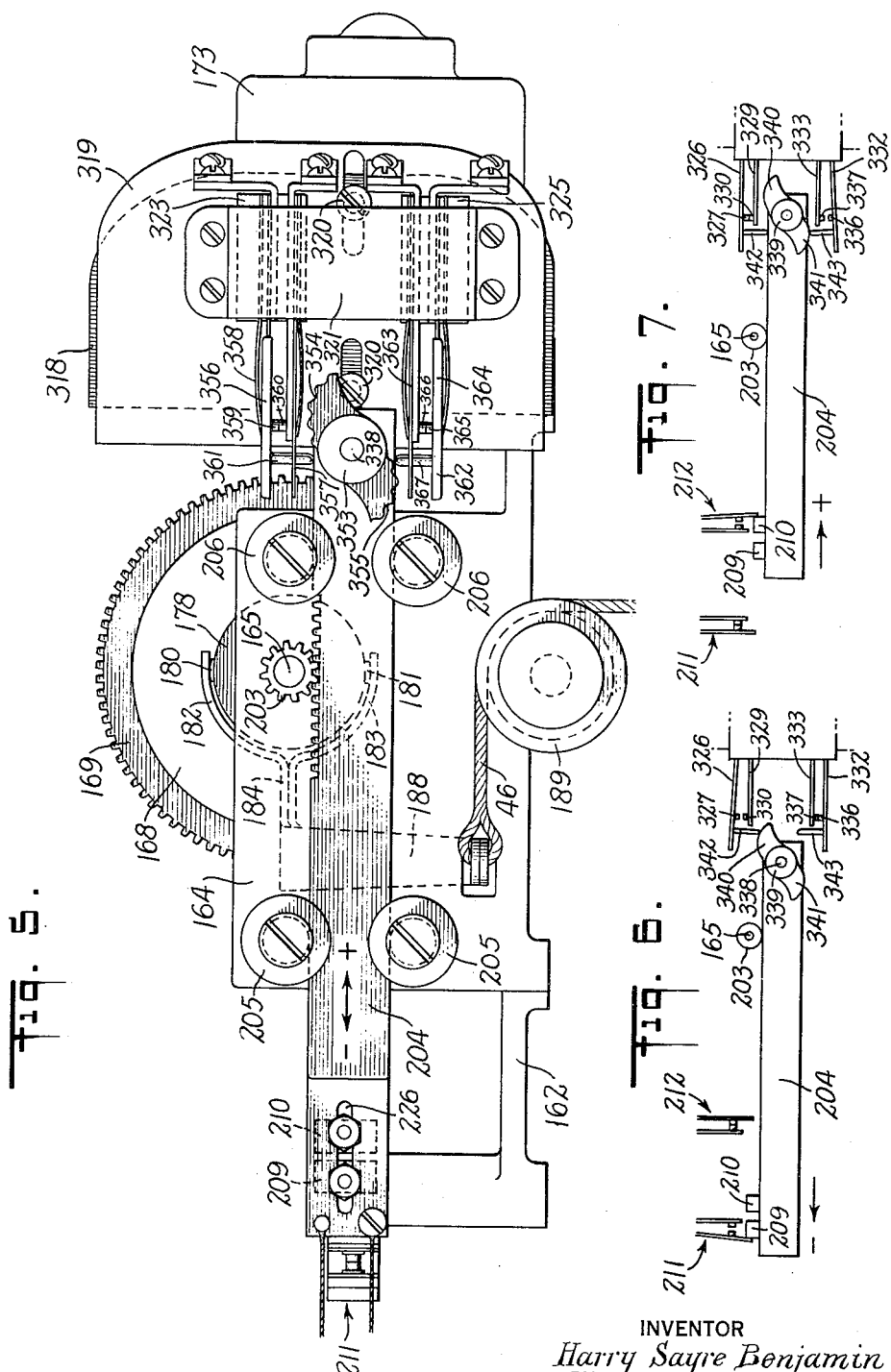

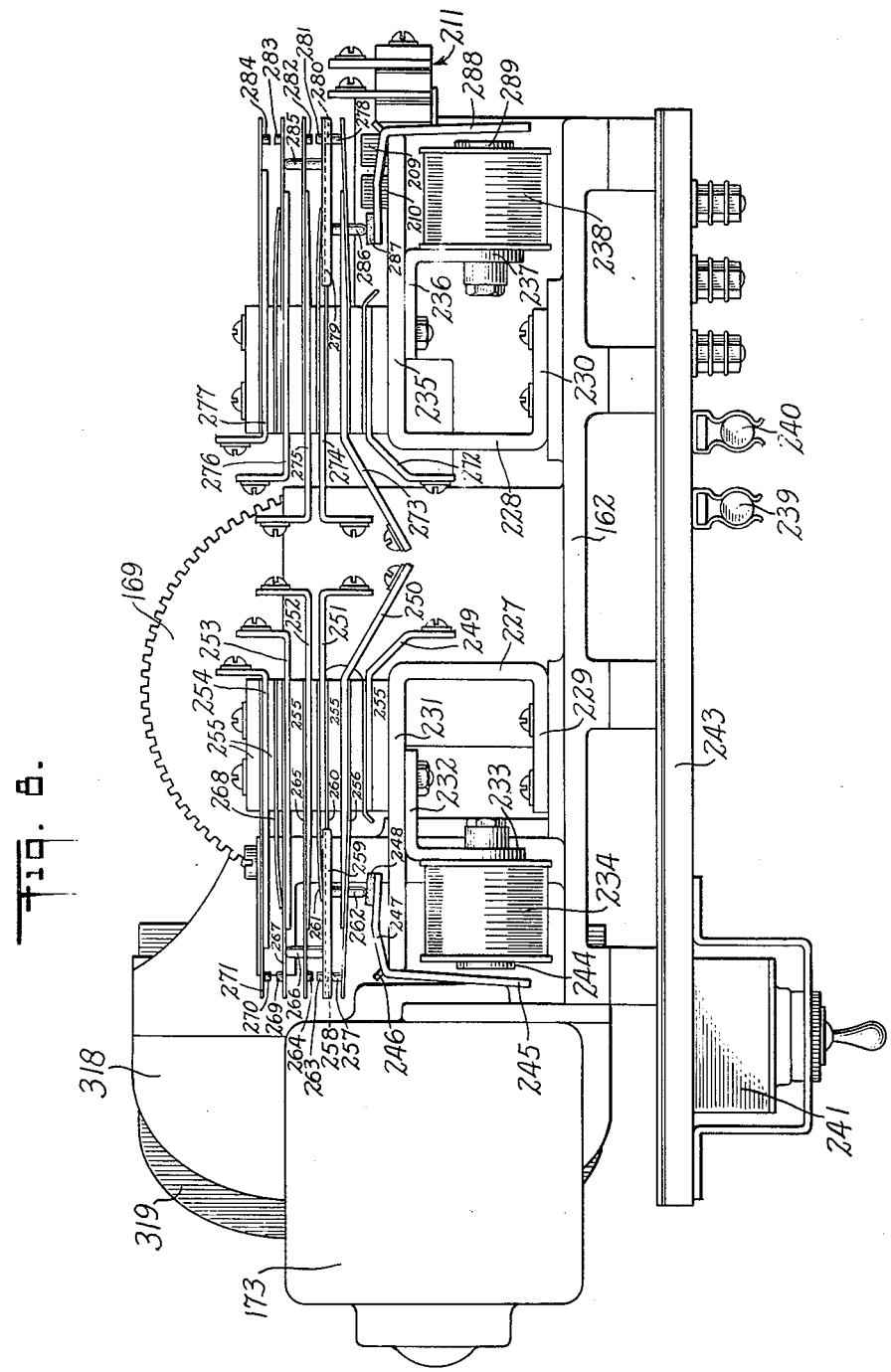

Figures 9, 9A, 10, 11A:
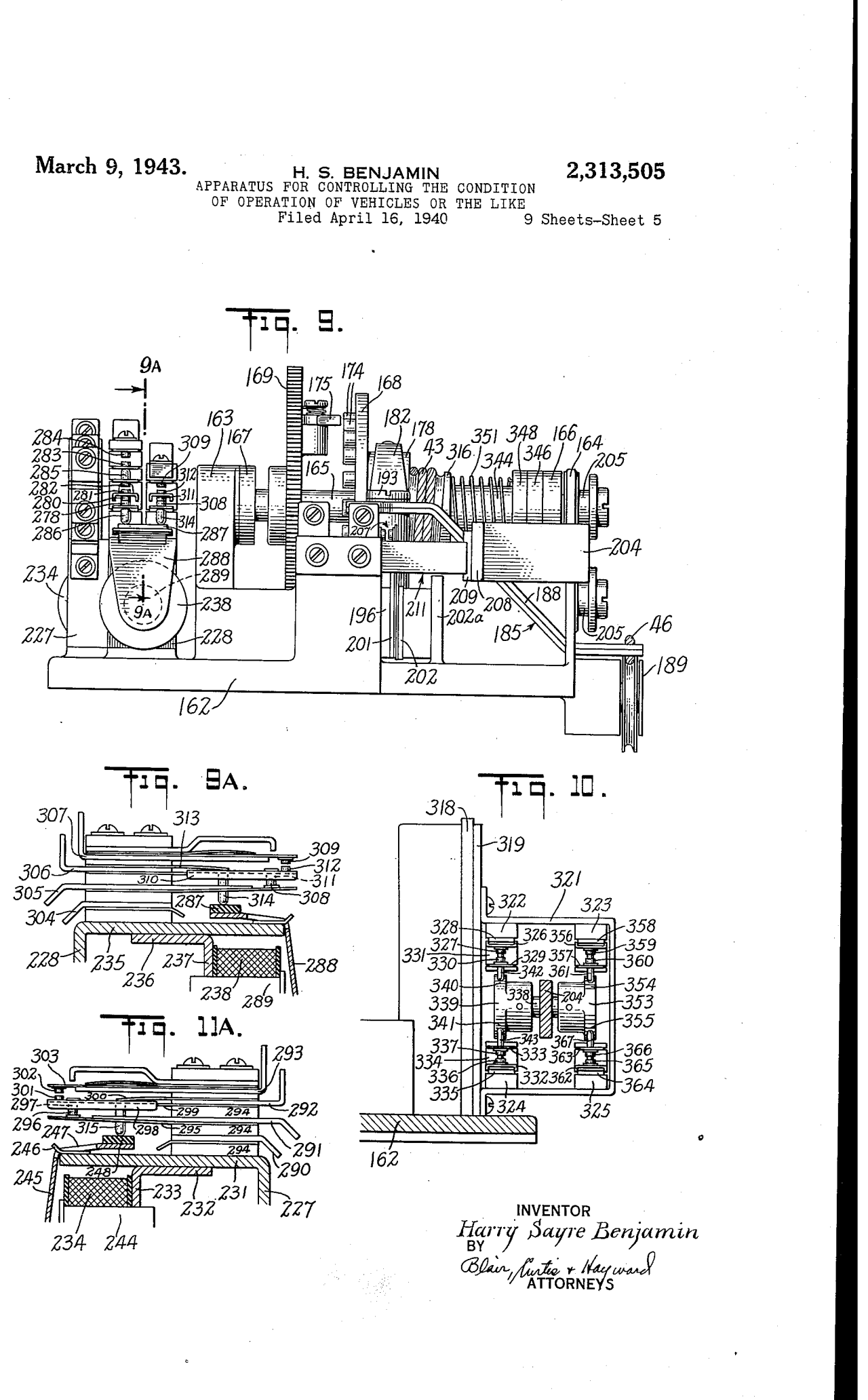

March 9, 1943.                     H. S. BENJAMIN                      2,313,505
           APPARATUS FOR CONTROLLING THE CONDITION
              OF OPERATION OF VEHICLES OR THE LIKE
                    Filed April 16, 1940            9 Sheets-Sheet 5

INVENTOR
*Harry Sayre Benjamin*
BY
*Blair, Curtis & Hayward*
ATTORNEYS

March 9, 1943.
H. S. BENJAMIN
2,313,505
APPARATUS FOR CONTROLLING THE CONDITION
OF OPERATION OF VEHICLES OR THE LIKE
Filed April 16, 1940
9 Sheets-Sheet 6
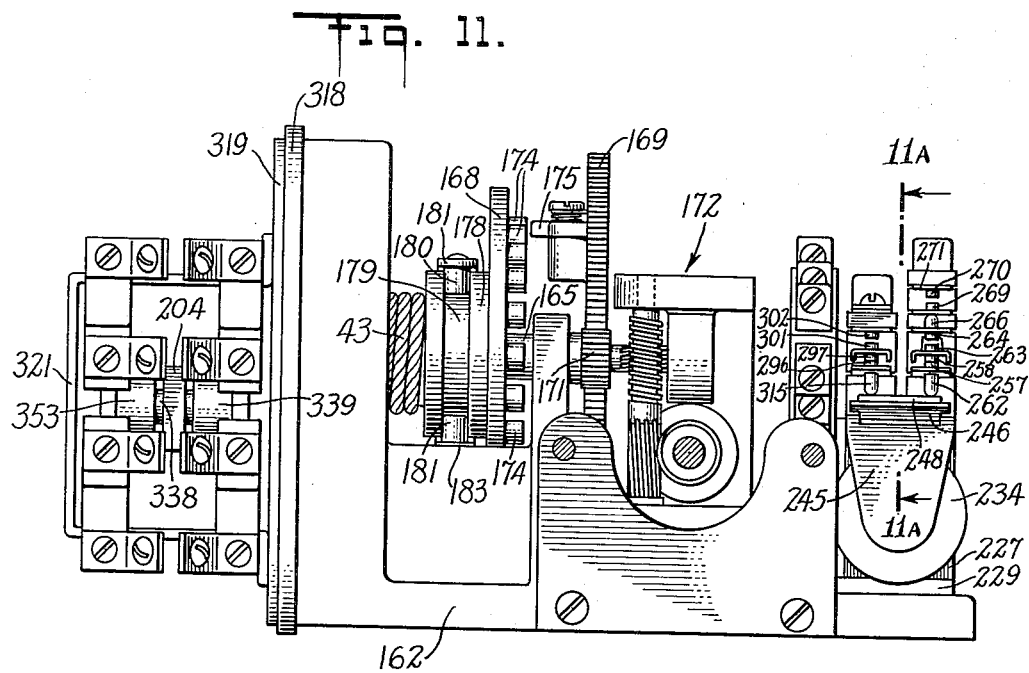
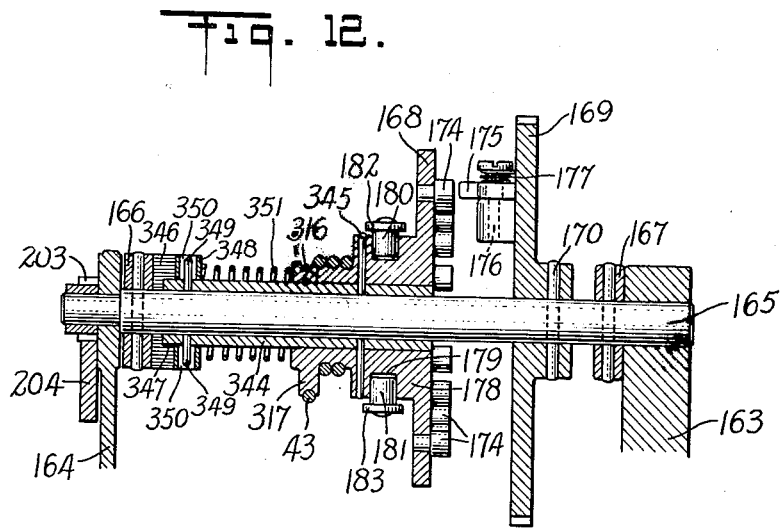
INVENTOR
Harry Sayre Benjamin
BY
Blair, Curtis & Hayward
ATTORNEYS March 9, 1943.
H. S. BENJAMIN
2,313,505
APPARATUS FOR CONTROLLING THE CONDITION
OF OPERATION OF VEHICLES OR THE LIKE
Filed April 16, 1940
9 Sheets-Sheet 7
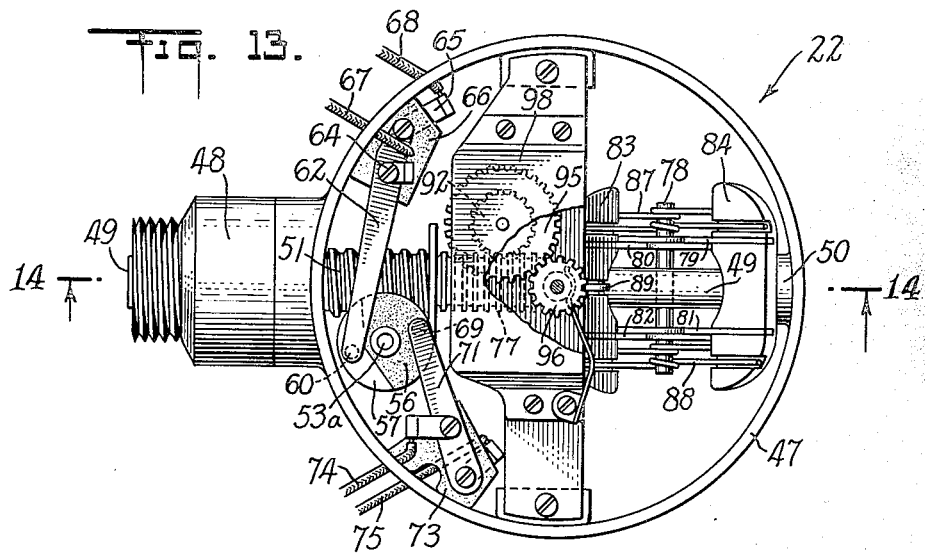
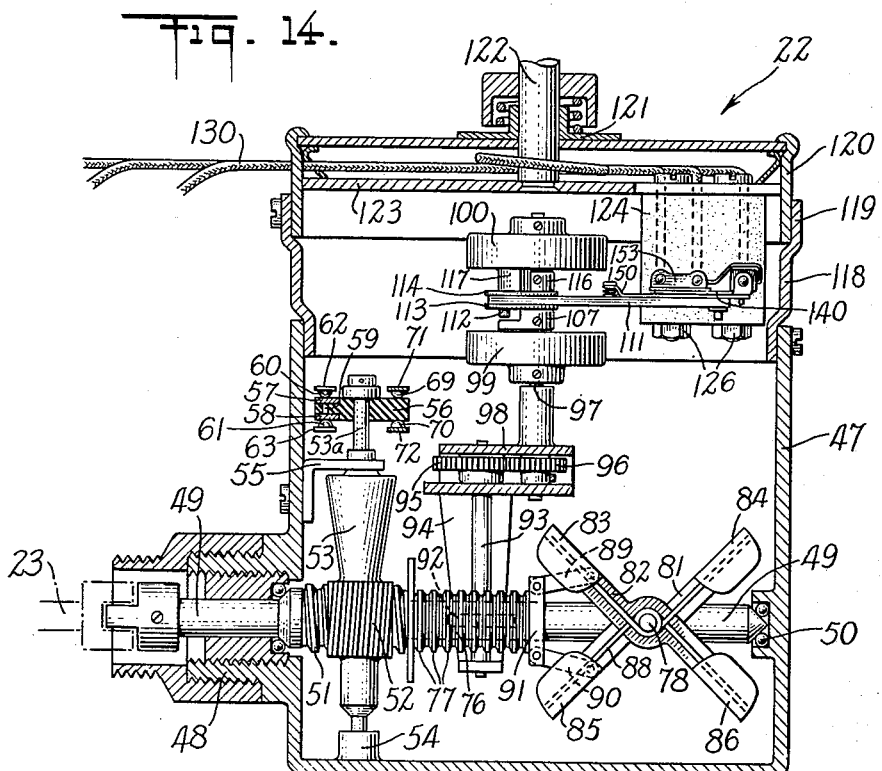
INVENTOR
*Harry Sayre Benjamin*
BY
*Blair, Curtis & Hayward*
ATTORNEYS March 9, 1943.　　　　H. S. BENJAMIN　　　　2,313,505
APPARATUS FOR CONTROLLING THE CONDITION
OF OPERATION OF VEHICLES OR THE LIKE
Filed April 16, 1940　　　　9 Sheets-Sheet 8
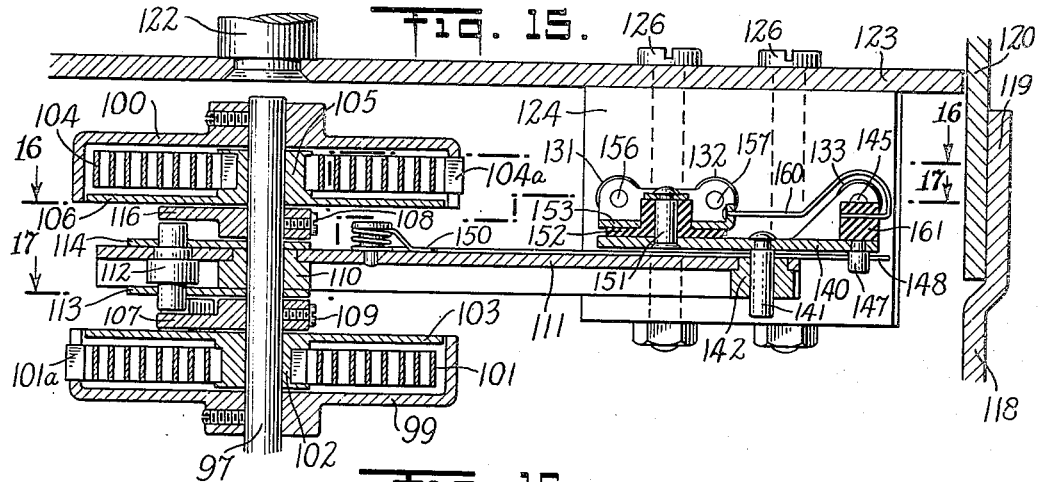
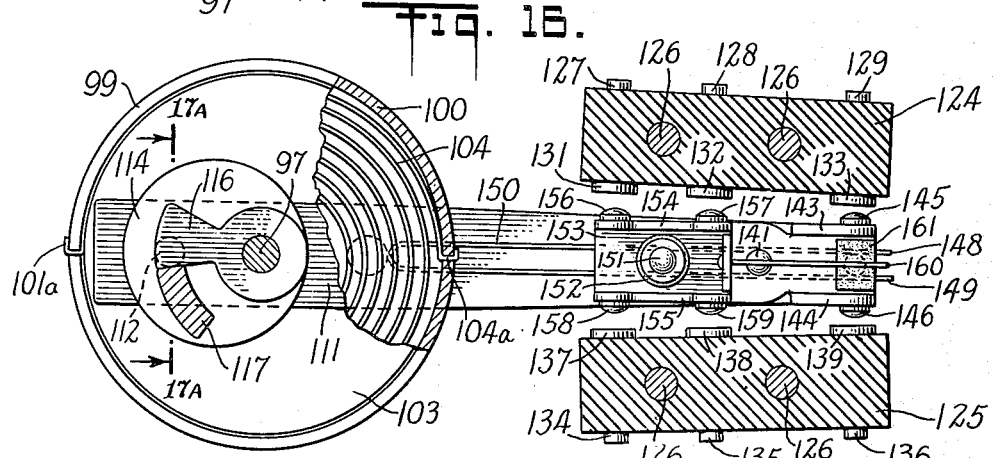
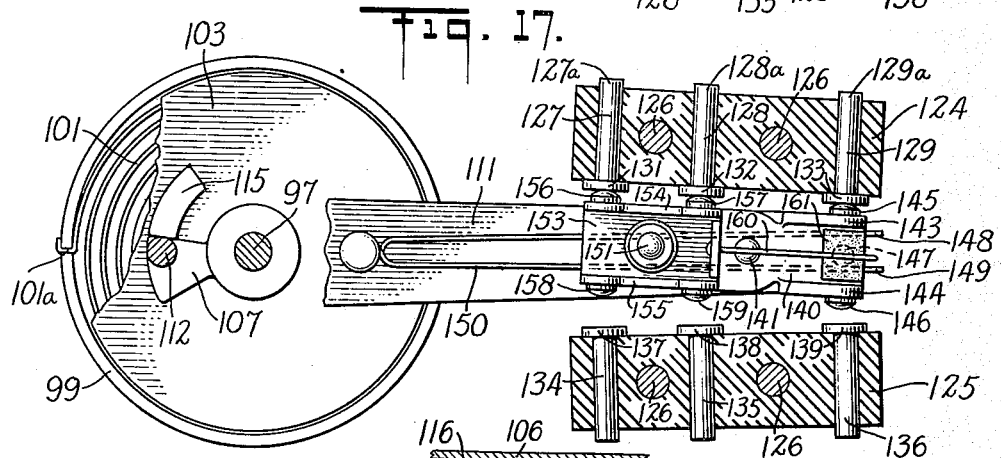
INVENTOR
Harry Sayre Benjamin
BY
Blair, Curtis & Hayward
ATTORNEYS

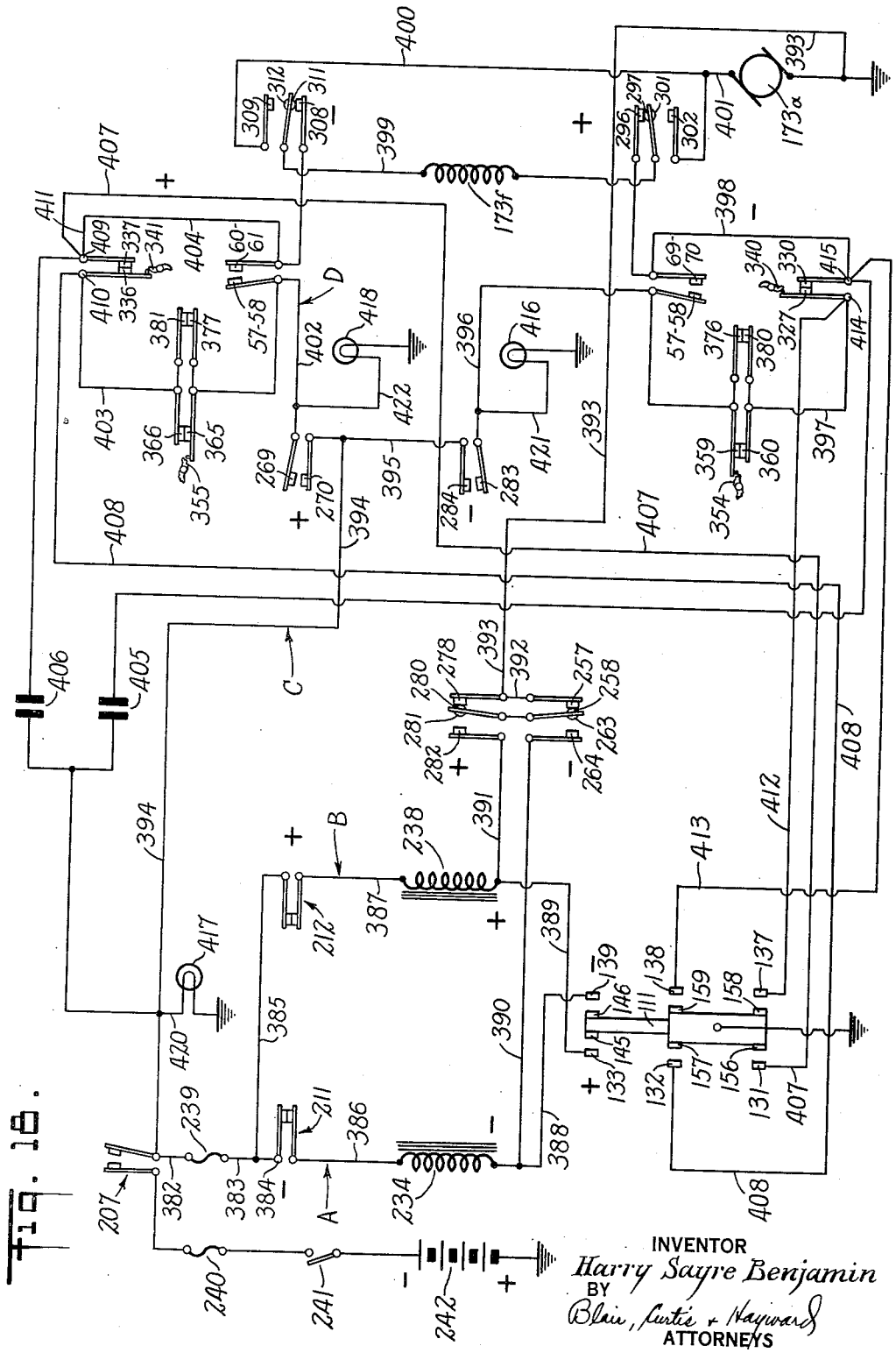

Patented Mar. 9, 1943

2,313,505

UNITED STATES PATENT OFFICE 2,313,505

APPARATUS FOR CONTROLLING THE CONDITION OF OPERATION OF VEHICLES OR THE LIKE

Harry Sayre Benjamin, Poughkeepsie, N. Y.

Application April 16, 1940, Serial No. 329,886

24 Claims. (Cl. 180—77)

This invention relates to a method of and apparatus for controlling a condition of operation of a vehicle or the like.

One of the objects of this invention is to provide apparatus for controlling an operative condition of a vehicle or the like, which is relatively simple and sturdy in construction, and which is thoroughly reliable under conditions of rigorous use and for extended periods of time. Another object of this invention is to provide a method of controlling an operative condition of a vehicle or the like, such as for example the speed of an automobile, by which such operative condition can be sensitively controlled with a minimum of manual attention. Other objects will be in part apparent and in part pointed out hereinafter.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the drawings, in which is shown an embodiment of my invention,

Figure 1 is a schematic perspective view of the interior of an automobile, the dashboard of which has installed thereon my control apparatus;

Figure 2 is an enlarged elevation of a part of the apparatus shown in Figure 1;

Figure 3 is an enlarged elevation of a switch shown in Figure 1;

Figure 4 is an enlarged top plan view of the operator in my control apparatus;

Figure 4A is a fragmentary elevation of a portion of the apparatus shown in Figure 4;

Figure 5 is a front elevation of the operator;

Figure 6 is a schematic view showing a portion of the operator in one position;

Figure 7 is a view similar to Figure 6, but showing the portion of the operator in another position;

Figure 8 is a rear elevation of the operator;

Figure 9 is a side elevation of the operator;

Figure 9A is a fragmentary sectional elevation taken along the line 9A—9A of Figure 9;

Figure 10 is a fragmentary sectional elevation taken along the line 10—10 of Figure 4;

Figure 11 is a fragmentary elevation of the other end of the operator;

Figure 11A is a fragmentary sectional elevation taken along line 11A—11A of Figure 11;

Figure 12 is a fragmentary sectional elevation taken along the line 12—12 of Figure 4;

Figure 13 is a horizontal section of a speedometer forming a part of my apparatus;

Figure 14 is a sectional elevation taken along the line 14—14 of Figure 13;

Figure 15 is an enlarged sectional elevation of a switch operated by the speedometer shown in Figures 13 and 14;

Figure 16 is a horizontal section taken along the line 16—16 of Figure 15;

Figure 17 is a horizontal section taken along the line 17—17 of Figure 15;

Figure 17A is a section taken along line 17A—17A of Figure 16; and,

Figure 18 is a wiring diagram showing electrical circuits for my control apparatus.

Similar reference characters refer to similar parts throughout the several views of the drawings.

In the operation of an automobile, for example, it is quite difficult, if not impossible, to maintain the speed of the car at a desired level, particularly over a hilly road, and for an extended period of time. In endeavoring to do so, the driver is considerably fatigued and is subjected to considerable eye strain from the necessity of constantly glancing at the speedometer to make repeated checks on his speed.

Furthermore, the driver is always opening or closing the throttle excessively in his attempt to maintain a constant speed, and this type of carburetor actuation is wasteful of gasoline.

Various types of apparatus have been devised in an endeavor effectively to control car speed in such a way as to maintain it at a level, but few, if any of these devices have attained any appreciable success because of lack of sensitivity, and because they are unable both to control the car speed and yet be of such a nature that the car can be operated independently thereof at any desired instant. These control devices, furthermore, are relatively inflexible in operation and result in over-shooting and under-shooting the desired speed to such an extent as to render them practically useless for their intended purpose. Such control devices of the nature here under consideration have been characterized by their wastefulness of fuel, as their lack of sensitivity resulted in a failure to meter minutely the fuel so as to deliver only the required amount thereof to maintain the desired speed of the car up or down a grade. It is obvious that inconsistent driving speeds result in varying motor temperatures in excess of the necessary minimum temperature, which results in a wastage of oil from evaporation. As noted, these control devices are incapable of gradually metering the fuel as required, and hence permit excess fuel flow to the engine, the excess power from which results in undue and unnecessary expenditure of energy which in turn contributes to a premature wearing of parts and consequently an earlier obsolescence thereof. It is accordingly another object of my invention to provide a method of and apparatus for controlling the speed of a car which obviate the above difficulties, in addition to many others.

Referring now to Figure 1, an automobile dashboard 20 is provided with a conventional instrument panel 21, on which are mounted the usual instruments found on such a dashboard. The several mechanisms which comprise my control device may be mounted on the rear of the dashboard or, if desired, on the front of the dashboard in the engine compartment. These mechanisms include a governor actuated device, generally indicated at 22, such as a speedometer, operatively connected as by a flexible cable 23 to stepped up gearing (not shown) which is in turn connected to the automobile transmission (not shown) so that the flexible cable is driven at a desirably increased rate of rotation relative to the rate of rotation of the normally driven speedometer shaft.

As will be described later, speedometer 22 includes among other things an adjustable switch, operable from the car's interior by a knurled knob 24 connected to the switch by a rod 25 extending into the speedometer casing. Knob 24 also includes a pointer 26 movable over a scale 27 suitably graduated in miles per hour.

Rod 25 also has secured thereto a slotted cam 28 (Figure 2) in the slot 29 of which is disposed a pin or follower 30. Pin 30 is connected to a link 31 mounted for sliding movement in suitable guides formed in a strap 32 or the like, suitably mounted back of the dashboard 20 (Figure 1). Strap 32 includes a bent-in lip 33 having a hole 34 formed therein, through which extends a wire 35 connected to link 31 as by a screw clamp 36 or the like. Wire 35 extends into a housing 500 or the like in which is disposed the operator of my control apparatus, wire 35 being connected to an adjustable part therein, as will be described in detail hereinbelow.

As noted above, speedometer 22 includes an adjustable switch and also includes other circuit elements, all of which are connected to suitable terminals in a terminal box 37 by a cable 38. The terminals in terminal box 37 are connected to their respective electrical elements in operator housing 500 by a cable 39.

The operator in housing 500 is connected to an accelerometer 40 by a wire 41, and to a carburetor lever or bell crank 42 by a wire 43 suitably guided around antifriction devices such as pulleys 44. The operator in housing 500 is conditioned for operation by means of a foot pedal generally indicated at 45, depression of which effects actuation of the operator by means of a wire 46 connected thereto.

Practically all modern cars are equipped with a foot accelerator, actuation of which prescribes a definite and often unnatural posture on the part of the driver, from which he cannot readily move without either taking his foot from the accelerator, depressing or releasing it. The distance between the accelerator pedal and the back of the front seat of the car, while adjustable in many cases, is more or less predetermined by the car manufacturer, and this distance is not always suited to the length of the driver's legs. While many car seats are adjustable, their adjustment is provided primarily to permit free movement of the arms with relation to the steering wheel, rather than to accommodate the driver's leg length to the accelerator pedal. Hence, it may be seen that foot pedal 45 may be located as desired beneath the steering wheel of the car on the floorboard thereof so as to relieve the unnatural and fatigue-producing attitude which the driver otherwise assumes in operating the foot accelerator.

Referring now to Figure 13, speedometer 22 includes a cylindrical casing 47, from the lower portion of which extends a boss 48 or the like (Figure 14) which rotatably mounts one end of a shaft 49 adapted to be connected to flexible cable 23. The other end of shaft 49 is suitably mounted in a ball bearing 50 carried on the side of casing 47. Shaft 49 (Figure 14) has secured to the left end thereof a worm 51 which rotates with the shaft and drives a gear 52, in turn mounted on a shaft or rotor 53, the lower end of which is journaled in a boss 54 extending from the bottom of casing 47, and the upper end of which extends through and is journaled in a bracket 55 secured to the side of casing 47. The upper end 53a of shaft 53 has secured thereto a dielectric disc 56 on opposite sides of which are mounted crescent-shaped contact plates 57 and 58 (see also Figure 13). Plates 57 and 58 (Figure 14) are connected by one or more pins 59, which serve not only to hold the plates on disc 56, but also comprise a good electrical connection therebetween. Disc 56, and accordingly contact plates 57 and 58 are engaged by a pair of contacts 60 and 61 which are respectively mounted on spring arms 62 and 63. As is more clearly shown in Figure 13, spring arms 62 and 63 are connected respectively to terminals 64 and 65 mounted in a dielectric block 66 secured to the side of casing 47, the terminals in turn being connected to suitable conductors or wires 67 and 68.

The second pair of contacts 69 and 70 (Figure 14) are connected to spring arms 71 and 72, which are in turn mounted on a dielectric block 73 and electrically connected respectively to a pair of conductors or wires 74 and 75 in a manner similar to that described above in connection with spring arms 62 and 63. As contacts 60 and 61, and contacts 69 and 70 are disposed on opposite sides of the axis of disc 56, the two pairs of contacts are intermittently engaged by contact plates 57 and 58 during rotation thereof. When either pair of contacts is so engaged, a circuit is completed between the spring arms 62 and 63, for example, by way of contacts 60 and 61, plates 57 and 58 and pin 59. A circuit is similarly completed through spring arms 71 and 72, and the purpose of these circuits will be described when the operation of my control apparatus is taken up in detail below.

Still referring to Figure 14, shaft 49 has loosely disposed thereon a sleeve 76 having annular ridges 77 regularly spaced therealong in the general form of a rack. The right-hand end of shaft 49, as viewed in Figure 13, has a pin 78 extending therethrough on the opposite ends of which are mounted respectively a pair of arms 79, 80 and 81, 82. These arms, respectively, carry at their ends governor weights 83, 84, 85 and 86. A pair of springs 87 and 88 are coiled about the opposite ends of pin 78, and the ends of these springs are connected to the governor weights 83—86 so as to bias the weights toward their open position as shown in Figure 14. Weights 83 and 85 are connected as by links 89 and 90 to a collar 91 or the like, slidably mounted on shaft 49 and connected to sleeve or rack 76. Thus, during the rotation of shaft 49, the tendency of governor weights 83—86 is to close against the bias of their opening springs, the amount of closing being a function of the rate of rotation of shaft 49 and accordingly of the car speed, as this shaft is connected to the transmission, as pointed out above. Movement of the governor weights is, of course, reflected in movement of sleeve 76 which moves to the right on shaft 49, as viewed in Figure 14, upon acceleration of the car, and moves to the left on the shaft during deceleration of the car.

Rack 76 meshes with a gear 92 (Figure 13) connected to the lower end of a shaft 93, the opposite ends of which are suitably journaled in a flanged bracket 94. A gear or pinion 95, which is connected to the upper end of shaft 93, meshes with a pinion 96 secured to the lower end of a shaft 97 rotatably mounted in a bracket 98 suitably secured within casing 47. The gear ratio between pinions 95 and 96 is preferably on the order or 1½ to 1, so that slight movement of rack 76 is translated by way of gears 92, shaft 93 and gear 95 into substantial angular movement of gear 96, and accordingly shaft 97. As noted above, shaft 49 is connected by way of cable 23 to the automobile transmission through the stepped up gears which afford an increase in speed of cable 23 over that of the automobile speedometer shaft on the order of approximately two rotations to one. Accordingly, the governor speed is also doubled in relation to the conventional speedometer cable when compared to the propeller shaft speed which renders the governor more sensitive to speed changes in the automobile, and this for a purpose which will appear below.

As noted above, shaft 97 (Figure 14) extends upwardly through bracket 98, and as is more clearly shown in Figure 15, has secured thereto a pair of inwardly facing cups 99 and 100, which are suitably spaced from one another, these cups accordingly rotating with shaft 97 upon actuation thereof. Cup 99 acts as a shield and anchor for a coil spring 101, one end 101a of which is anchored in the side of the cup. The inner end of spring 101 is anchored to a hub 102, projecting from a plate 103 disposed in the upper end of cup 99, both hub 102 and plate 103 being rotatably mounted on shaft 97 to permit relative movement therebetween, and hence tensioning of spring 101. Similarly, cup 100 houses a coil spring 104, the outer end 104a of which is secured to the side of cup 100, and the inner end of which is anchored to a hub 105 extending from a plate 106, both the plate and hub being loosely mounted on the upper end of shaft 97 for movement relative to cup 100 and accordingly to permit tensioning of spring 104.

Shaft 97 also carries a pair of stops 116 and 107, which are adjustable about the shaft and which may be set in any desired position by set screws 108 and 109. Stops 116 and 107 are disposed on opposite sides of a block 110 or the like loosely mounted on shaft 97 so as to be capable of rotation relative thereto. Block 110 has secured thereto an arm 111, one end of which carries a pin 112. This pin also extends through a pair of plates 113 and 114 which encircle shaft 97 and may be secured to the opposite sides of block 110 and to arm 111 so that the block arm plates and pin may be rotated about shaft 97 as a unit. As is shown in Figure 17A, plates 103 and 106 have projecting therefrom respectively lugs 115 and 117 and these lugs extend almost to plates 114 and 113 so that they lie in the paths of movement of stops 107 and 116. Lugs 115 and 117 are also engageable with the opposite ends of pin 112.

As hereinbefore noted, plates 103 and 106 are movable relative to shaft 97 and accordingly their respective lugs 115 and 117 are similarly relatively movable thereto, and also relatively movable to stops 107 and 116. Lugs 115 and 117 are also movable relative to pin 112, which is in turn movable relative to stops 107 and 116, and accordingly shaft 97. Therefore, clockwise movement of shaft 97 (its direction of movement during car acceleration) causes stop 107 (Figure 17) to abut lug 115 and move the lug and accordingly plate 103 (Figure 15) against the bias of spring 101. Similarly, upon counterclockwise movement of shaft 97, stop 116 forces lug 117 of plate 106 (see Figure 17) counterclockwise against the bias of spring 104 (Figure 15).

As shown in Figure 14, a ring 118 is secured to the top of casing 47 and has an upper expanded annular portion 119 adapted to close the open end of casing 47. A suitable bearing 121 formed on cover 120 rotatably receives a shaft 122, the inner end of which carries a disc 123. As shown in Figure 17, disc 123 has secured thereto a pair of blocks 124 and 125 formed of suitable insulating material. As shown in Figure 15, these blocks may be secured to disc 123 as by screws 126 or the like. Block 124 (Figure 17) carries a plurality of metallic pins 127, 128 and 129 whose outer ends 127a, 128a and 129a form suitable binding posts for the attachment of lead wires 130 (Figure 14). The inner ends 131, 132 and 133 of pins 127, 128 and 129 are suitably shaped to form contacts, the purpose of which will be described below. Block 125 is substantially similar to block 124, and accordingly is provided with binding posts 134, 135 and 136, electrically connected to contacts 137, 138 and 139. The distance between the right-hand ends of blocks 124 and 125, as viewed in Figure 17, is slightly less than the distance between their left-hand ends, and thus there is formed a tapering space between the blocks, which receives a swivelable plate 140 (Figure 15) pivotally connected as by a pin 141 to a block 142 secured to the end of arm 111. The right-hand end of plate 140, as viewed in Figure 16, has a pair of upstanding lugs 143 and 144 on which respectively are mounted contacts 145 and 146. A pin 147 (Figure 15) extends downwardly from the right-hand end of plate 140 between the free ends 148 and 149 of a spring 150 secured in any suitable manner along the top of arm 111. Spring ends 148 and 149 are biased toward one another, and accordingly tend to maintain the longitudinal axis of plate 140 parallel to the longitudinal axis of arm 111.

Plate 140 also has secured thereto and extending upwardly therefrom a post 151 on which is pivotally mounted a dielectric washer 152 or the like. Washer 152 in turn carries a substantially U-shaped support 153 having flanges or sides 154 and 155 (Figure 17) the former of which carries a pair of contacts 156 and 157, and the latter of which carries a pair of contacts 158 and 159. These contacts are all electrically connected by reason of their mounting in bracket 153, but are insulated from arm 111 and the various elements carried thereby, by the dielectric washer 152. Preferably a spring wire 160 (Figure 15) is secured in a block 161 mounted on the end of plate 140, wire 160 being curled upwardly and over the block to extend rearwardly and into a suitable hole formed in the base of bracket 153 substantially centrally thereof. The function of wire 160 (see Figure 16) is to maintain bracket 153 in axial alignment with plate 140.

It may now be seen that the several contacts carried on the outer end of arm 111 are positioned within the tapering space between blocks 124 and 125 in such a manner that but slight movement of arm 111 counterclockwise, for example, causes engagement between movable contacts 156, 157, 145 (Figure 17) and stationary contacts 131, 132 and 133. Similarly, clockwise movement of arm 111 engages movable contacts 158, 159 and 146, respectively, with stationary contacts 137, 138 and 139. Furthermore, as the distance between stationary contacts 133 and 139 is less than that between the contacts in the other end of blocks 124 and 125, engagement between contacts 133 and 145, for example, will occur before engagement between contacts 132 and 157, for example. It may also be seen that through the ability of bracket 153 to swivel, the contacts it carries may readily engage their corresponding stationary contacts.

As noted above, disc 123 (Figure 15) is rotatable, and accordingly blocks 124 and 125 and the contacts they carry may be adjusted about the axis of arm 111, which is coaxial with shaft 122, and as arm 111 may be rotated about the axis of shaft 97 independently of the shaft, blocks 124 and 125 and the several contacts carried by arm 111 may be adjusted as desired for a purpose to be described hereinbelow. It should also be remembered that movement of shaft 97, and accordingly arm 111, depends on the actuation of governor weights 83—86 (Figure 14). When the car is moving, these weights are in the position shown in Figure 14, and arm 111 is in the position shown in Figure 16, assuming that no adjustment has been made to blocks 124 and 125. If, however, these blocks have been adjusted to a desired position by rotation of shaft 122 in disc 123, then the contacts 156, 157 and 145 are biased against contacts 131, 132 and 133 (Figure 17) by the bias of spring 101 acting through arm 111, as described above. Upon acceleration of the car, however, the governor is actuated to rotate shaft 97 clockwise, and when the shaft has rotated sufficiently for stop 107 (Figure 17) to engage lug 115 and move the lug slightly, the lug movement is transmitted to arm 111 as heretofore described, and the contacts 156, 157 and 145 are moved away from their corresponding stationary contacts. If the car speed increases still further, then the bias exerted by the governor will further move arm 111 clockwise to effect engagement between arm contacts 158, 159 and 146 with stationary block contacts 137, 138 and 139. Further continued bias of the governor will, however, have no further effect on arm 111 because, as noted above, the arm is movable independently of shaft 97.

The contacts on arm 111 and on blocks 124 and 125 are provided for the energization of the operator housed in housing 500 (Figure 1) and these contacts complete circuits for effecting such operation, all as will be described hereinbelow. It might be added, at this point, however, that the contacts in block 124, when engaged, close circuits which result in acceleration of the car, whereas when the contacts in blocks 125 are engaged, circuits are closed which cause deceleration of the car, and the car speed is maintained at a substantially uniform level by fluctuation of the movable contacts on arm 111 back and forth between the stationary contacts and blocks 124 and 125. As arm 111 is highly sensitive to any variation in the condition of governor weights 83—86 (Figure 14) but slight variation in car speed is necessary to change the position of arm 111 (Figure 19) and accordingly the contacts carried thereby.

As is more clearly shown in Figure 1, shaft 122 by which the position of blocks 124 and 125 (Figures 15 and 17) may be set, is coupled to shaft 25 (Figure 1) which as before described, is connected to knob 24. Thus the driver of the car, by setting knob 24, sets the contacts in speedometer 22 in any desired position, at which they are operative to maintain the car speed at the level selected.

Referring now to Figure 4, wherein a top plan view of the operator disposed in housing 500 (Figure 1) is shown, a base plate 162 forms the main support for the various elements which comprise the operator. A pair of supports 163 and 164 extend upwardly from plate 162 and journal therebetween a rotatable shaft 165, see also Figure 12, which is maintained in proper position by a pair of collars 166 and 167 pinned thereto. A pair of clutch elements 168 and 169 are mounted on shaft 165, the former being rotatable relative thereto, and the latter being rotatable therewith, by reason of its connection thereto by a pin 170. Clutch element 169 is peripherally toothed, and meshes with a pinion 171 (Figure 4) which is driven through suitable reduction gears generally indicated at 172, by a reversible electric motor 173. Clutch element 168 has projecting therefrom toward element 169 a plurality of pins 174 which are adapted to engage one or more of a plurality of dogs 175 secured to clutch element 169. Dogs 175 are pivotally mounted on clutch element 169 as by pins 176, and a suitable spring 177 (see also Figure 12) is provided for each of dogs 175 to bias each clockwise about its pivot so that normally the dogs remain in the attitude shown in Figure 4. Hence, when clutch elements 168 and 169 are engaged, and element 169 is driven clockwise, i. e., from left to right, as viewed in Figure 4, clutch pins 174 engage the free ends of dogs 175 to impart clockwise rotation to clutch element 168. While the clutch elements are in engagement, counterclockwise movement of clutch element 168 can occur only upon similar movement of element 169, element 168, however, always being free to rotate clockwise, regardless of whether the elements are engaged or not because of the ability of dogs 175 to pivot and accordingly overrun the clutch pins 174, this action being provided for a purpose to be described.

Referring to Figure 12, clutch element 168 is provided with a hub 178 having an annular groove 179 formed therein. This groove slidably receives on opposite sides of the hub a pair of pins 180 and 181 connected to the separated ends 182 and 183 of a yoke 184 (Figure 4) forming one arm of a bell crank lever generally indicated at 185, which is pivotally mounted on a post 192 or the like (Figure 4A) by a suitable screw 193 or the like. Bell crank lever 185 is biased clockwise, as viewed in Figure 4, as by a spring 186 connected at one end to yoke arm 184 of the lever, and at the other end to a suitable boss 187 or the like projecting from plate 162. Bell crank 185 also includes an arm 188 to the free end of which is secured cable 46 (see Figure 5) this cable being trained around a pulley 189 or the like, and leading to foot pedal 45 (Figure 1). It will now appear that depression of foot pedal 45 tensions cable 46 (Figure 4) and causes counterclockwise movement of bell crank 185 to effect axial movement of clutch element 168 along shaft 165 until it engages clutch element 169 to be driven thereby.

Bell crank 185 includes a third arm 190 which carries a depending pin 191 at its free end, the pin preferably being formed of suitable dielectric material. Upon counterclockwise movement of bell crank 185 (Figure 4) to engage clutch elements 168 and 169, bell crank arm 190 is also moved, this movement being utilized to close a main contact generally indicated at 207.

A leaf spring 194 (Figure 4A), which is clamped between a metallic conductor plate and a dielectric supporting block 196 extends upwardly therefrom into the path of movement of dielectric pin 191, the upper end of the leaf spring carrying a contact 197. A stationary contact 198 is mounted on the upper end of another leaf spring 199, which is held in an adjusted stationary position by a supporting leaf 200, leaves 199 and 200 being clamped between a metallic conductor plate 201 and a dielectric support 202 secured to a post 202a or the like extending from plate 162. Upon sufficient movement of pin 191, contacts 197 and 199 engage to close the circuit to reversible motor 173 to actuate the operator. Thus foot pedal 45 (Figure 1) by way of cable 46, bell crank 185 (Figure 4) arm 190 and pin 191 controls main contact 207.

Operation of the operator in one direction by motor 173 opens the carburetor of the automobile to increase the speed, whereas operation of the operator in reverse direction by the motor closes the carburetor to decrease the speed. This forward and reverse operation is reflected in clockwise and counterclockwise rotation of shaft 165, the shaft rotating counterclockwise during acceleration and clockwise during deceleration, all as viewed in Figure 5. This operation of shaft 165 is utilized to prevent jamming of the mechanisms which comprise the operator in either direction of operation thereof. To this end a pinion 203 is mounted on the front end of shaft 165 as viewed in Figure 5, and this pinion meshes with teeth formed on a reciprocable rack 204 guided between pairs of spaced rollers 205 and 206 rotatably mounted on support 164 extending upwardly from plate 162.

As is better shown in Figure 4, rack 204 includes an offset end 208 in which a pair of dielectric posts 209 and 210 are mounted. A pair of stop contacts generally indicated at 211 and 212 include portions positioned in the path of movement of posts 209 and 210 for deenergizing reversible motor 173 during either direction of its operation to prevent over-running of the operator in either direction of its operation to preclude jamming of any of the parts thereof. Contact 211 is effective to stop motor 173 during deceleration operation thereof, while contact 212 is effective in stopping acceleration operation of the motor. Thus deceleration contact 211 includes a movable contact 213 mounted on a leaf spring 214 which normally holds contact 213 in engagement with a stationary contact 215 also mounted on a leaf spring 216. Leaves 214 and 216 are held respectively in good electrical contact with a pair of metallic conductor plates 217 and 218, which are supported in proper position and insulated from one another by dielectric blocks 219. Similarly, acceleration stop contact 212 comprises a movable contact 220 mounted on a leaf spring 221, which normally holds contact 220 in engagement with a stationary contact 222 mounted on a leaf spring 223. Leaves 221 and 223 are held in good electrical contact respectively with metal conductor plates 224 and 225, supported and insulated by dielectric blocks similar to blocks 219. It may now be seen that when rack 204 moves to the left (Figure 4), i. e., in decelerating direction, post 209 on the end thereof eventually opens contact 211 to deenergize motor 173 and prevent jamming of the mechanism. Similarly, excessive acceleration movement of the rack to the right causes post 210 to open acceleration contact 212 and accordingly deenergizes motor 173. It might be noted that posts 209 and 210 on the end of rack 204 (Figure 5) are adjustable longitudinally of the rack by reason of the provision of a slot 226 formed therein so that the limits of acceleration and deceleration travel of the rack may be varied as desired.

At the rear of supporting plate 162, as shown in Figure 8, are a pair of substantially J-shaped brackets 227 and 228 whose respective shorter legs 229 and 230 are secured to plate 162. The longer leg 231 of bracket 227 has secured thereto an L-shaped anchor 232 whose depending arm 233 carries a relay 234, one side of which is electrically connected to deceleration stop contact 211, and the other side of which is electrically connected to stationary contact 139 (Figure 17) which is a deceleration contact (see also Figure 18).

Referring back to Figure 8, the longer arm 235 of bracket 228 has secured thereto an L-shaped anchor 236, the depending arm 237 of which supports what will be termed an acceleration relay 238. One end of the coil of relay 238 is electrically connected to acceleration stop contact 212 (Figure 4) while the other end of this relay coil is connected to stationary contact 133 (Figure 17) which is an acceleration contact (see Figure 18). Both relays 234 and 238 are electrically connected by way of stop contacts 211 and 212 (Figure 4) and a relay fuse 239 (Figure 8) to main contact 207 (Figure 4) which is in turn connected by way of a main fuse 240 (Figure 8) to one side of a manually operated switch 241, the other side of which is connected to a source of current 242 (Figure 18). Preferably switch 241 (Figure 8) is secured to a terminal block 243 or the like, which also carries fuses 239 and 240 so that these several parts may be readily accessible to the driver for manipulation or replacement.

Relay 234 has a core 244 extending from the left-hand end thereof, as viewed in Figure 8, for attraction of an armature 245 when the relay is energized. Armature 245 is generally L-shaped and is pivotally supported at the angle thereof by a lug 246 secured to the free end of longer leg 231 of J-shaped bracket 227, lug 246 extending through a suitable opening formed in the armature. Armature 245 also includes an arm 247 which extends above bracket leg 231, and has a dielectric block 248 mounted on its end. Bracket leg 231 has secured thereto a number of substantially rigid conductor plates 249, 250, 251, 252, 253 and 254, which are insulated and spaced from one another by a sufficient number of dielectric blocks 255. As noted above, one end of relay coil 234 is connected to stop contact 211, and this electrical connection is made by way of plate 249. Plate 250 supports a stationary leaf spring 256, the outer end of which carries a contact 257, which normally engages a contact 258 mounted on the under side of an arm 259 supported by a resilient arm 260, which is electrically connected to and carried by conductor plate 251. A spring 261 which is supported by plate 251 biases arm 259 downwardly to effect engagement of contacts 257 and 258. Arm 259 also has secured thereto a downwardly extending pin 262, the lower end of which rests on block 248 of armature arm 247. On the upper side of arm 259 near its end is another contact 263, which is normally out of engagement with a contact 264 mounted on the end of a resilient arm carried by contact plate 252 and electrically connected thereto.

Still referring to Figure 8, arm 259 also has mounted thereon an upwardly extending pin 266, which extends through a hole in arm 265 and bears against the bottom of a resilient arm carried by and electrically connected to conductor plate 253 and biased downwardly by a leaf spring 268 carried between adjacent blocks 255. Arm 267 carries a contact 269, which is engageable with but normally out of engagement with a contact 270 carried on the bottom side of a stationary arm 271 supported by and electrically connected to conductor plate 254. It may now be seen that when relay 234 is energized, armature 245 is attracted thereto, which causes its arm 247 to move pin 262 upwardly. This results in upward movement of arm 259, causing separation of contacts 257 and 258, engagement of contacts 263 and 264, and upward movement of pin 266 which engages contacts 269 and 270.

Bracket 228 for relay 238 also supports a plurality of conductor plates and contacts substantially similar to those as are supported by bracket 227. Accordingly, it will suffice to point out that bracket 228 supports conductor plates 272, 273, 274, 275, 276 and 277. Plate 272 is included in the electrical connection between relay 238 and stop contact 212. Plate 273 supports a stationary contact 278, while plate 274 carries an arm 279 on the lower and upper sides of which, respectively, are mounted contacts 280 and 281, the former of which is normally in engagement with contact 278, and the latter of which is engageable with a contact 282 carried by plate 275. Plates 276 and 277 respectively carry contacts 283 and 284, which are normally out of engagement with but which are engaged by upward movement of a pin 285 carried by arm 279. Arm 279 includes a downwardly extending pin 286 which rests against a dielectric block 287 carried on one arm of an L-shaped armature 288 pivotally supported by leg 235 of bracket 228, and this armature is attracted to the core 289 of relay 238 upon energization of the relay.

Contacts 257, 258, 263 and 264 are relay holding contacts for relay 234, and contacts 278, 280, 281 and 282 are relay holding contacts for relay 238. Contacts 269 and 270, at the upper left-hand corner of Figure 8, might be termed motor operating contacts, as engagement therebetween upon energization of relay 234 completes a circuit from the source of power to one side of the field of motor 173. Likewise, contacts 283 and 284, at the upper right-hand corner of Figure 8, may be termed operating contacts, as engagement therebetween upon energization of relay 238 closes the circuit which connects a source of power to the other side of the field of reversible motor 173. The coaction between the above-mentioned holding contacts and operating contacts, operated by relays 234 and 238, will be described in detail hereinbelow in connection with a description of the wiring diagram shown in Figure 18.

As noted hereinbefore, motor 173 (Figure 4) is reversible, and to effect this reversal in operation of the motor, contacts operated by relays 234 and 238 are provided. As shown in Figure 11A, bracket leg 231 supports a plurality of conductor plates 290, 291, 292 and 293, these plates being held in spaced and insulated relationship by insulating blocks 294 disposed therebetween. Plate 290 is electrically connected to relay 234 and to plate 252 (Figure 8) which is electrically connected to contact 264. Plate 291 is clamped by adjacent blocks 294 against an arm 295, which carries on its top side and at its end a contact 296. Contact 296 normally engages a movable contact 297 mounted on the bottom side of an arm 298 connected to a resilient arm clamped between conductor plate 292 and block 294. A spring 300 clamped between plate 292 and one of blocks 294 urges arms 298 and 299 downwardly to maintain contact between contacts 296 and 297. A contact 301 is mounted on the top side of arm 298 and is engageable with, but normally disengaged from, a contact 302 carried by an arm 303 supported by conductor plate 293. Contact 301 is connected by way of plate 292 to one side of the motor field, and contact 302 is connected by way of plate 293 to the motor armature. Hence, when these two contacts engage during energization of relay 234, the motor runs in a direction to effect deceleration operation of the operator. Energization of relay 234 effects engagement of contacts 301 and 302 by reason of plate 298 being lifted by a pin 315 biased downwardly against block 248 on armature arm 247 by spring 300.

Bracket leg 235 (Figure 9A) of bracket 228, which supports relay 238, has mounted thereon contacts and conductor plates substantially similar to those on bracket leg 231 (Figure 11A). Hence, it will suffice to point out, with reference to Figure 9A, that plates 304, 305, 306 and 307 are supported in spaced, insulated relationship, plates 305 and 307 carrying stationary contacts 308 and 309 respectively, while plate 306 is electrically connected to a resiliently supported arm 310 on the lower and upper sides of which are mounted respectively contacts 311 and 312, the former normally engaging contact 308 by reason of the downward bias of arm 310 by a spring 313, and the latter of which is normally spaced from, but is engageable with contact 309 upon energization of relay 238. Contact 309 is connected by way of plate 307 to the motor armature, and contacts 311 and 312 are connected by way of plate 306 to the other side of the motor field so that upon energization of relay 238 its armature 288 raises a pin to lift plate 310, and hence engage contacts 309 and 312 causing the motor to effect acceleration operation of the operator.

Referring now to Figure 12, it may be seen that hub 178 includes a winding drum 316 having an enlarged portion 317 on both of which carburetor cable 43 winds or unwinds during operation of clutch element 168. When clutch elements 168 and 169 are engaged and are rotating clockwise, as viewed in Figure 5, winding drum 316 (Figure 4) is rotated so that cable 43 unwinds therefrom to close the carburetor valve and hence effect deceleration of the car.

Similarly, counterclockwise movement of the clutch elements and winding drum winds cable 43 on the winding drum to open the carburetor valve and accelerate the car. The acceleration or deceleration of the car is always reflected in the attitude of the governor weights 83—86 (Figure 14) which, as pointed out above, control the position of contacts 145 and 146 (Figure 17) with respect to contacts 133 and 139, respectively, to energize the operator motor 173 (Figure 4) for operation in one direction or the other. However, if winding drum 316 rotates at its normal rate in accelerating or decelerating movement, the carburetor valve will be excessively opened or closed, because during acceleration the momentum of the car will cause the car velocity to exceed the desired rate during acceleration, and during deceleration the operator closes the carburetor valve at a rate which exceeds the rate of the car deceleration, and this also by reason of the momentum of the car. Hence the natural tendency is to overshoot the selected desired rate of speed during acceleration, and undershoot the speed during deceleration. To rectify this condition, I have provided mechanisms which effect intermittent actuation of the operator as the desired level of speed is approached, either during acceleration or deceleration, and I will now describe these mechanisms in detail.

As noted hereinabove, in connection with the description of Figure 14, flexible cable 23 rotates rotor 53 by way of worm 51 and gear 52, which are so proportioned that the rotor rotates preferably on the order of 16 revolutions per 1/10 mile, i. e., one revolution each thirty-three feet of car travel. Hence, for every thirty-three feet of car travel, rotating contacts 57 and 58 engage contacts 60 and 61 respectively and also contacts 71 and 72 respectively, and these contacts will hereinafter be referred to as interrupter contacts. These interrupter contacts are ineffective during the major portion of the acceleration and deceleration periods, and are shunted out of the operating circuits to the operator motor, by two different sets of shunt contacts operated by the speedometer shown in Figure 14 and rack 204 (Figure 4) as will be described in detail hereinafter.

Referring now to Figure 4, base plate 162 preferably includes a substantially vertical face 318 on which a plate 319 is slidably mounted as for example by screws 320 which extend through slots in plate 319 and are threaded into face 318 (see also Figure 11). A U-shaped bracket 321 (Figure 10) is screwed to plate 319, and to its upper horizontal arm are connected a pair of spaced dielectric blocks 322 and 323. The lower horizontal arm of bracket 321 also supports a pair of spaced dielectric blocks 324 and 325.

A contact arm 326 carrying on its lower surface a contact 327 is resiliently connected to block 322 and is biased downwardly by a spring 328 also secured to the block. A lower rigid contact arm 329 supports a contact 330 which is normally engaged by contact 327, contact arm 329 being secured to a dielectric block 331 which insulates contact arm 326 from arm 329. Block 324 also supports a pair of contact arm 332 and 333 which are spaced and insulated from one another by a dielectric block 334. Arm 332 is resiliently mounted on block 324 and is biased upwardly by a leaf spring 335. A pair of contacts 336 and 337 are connected respectively to contact arms 332 and 333, and by reason of the upward bias of arm 332 are normally in engagement. Contacts 327 and 330 and contacts 336 and 337 are shunt contacts which coact with interrupter contacts 57 and 58 (Figure 14) to shunt the interrupter contacts out of the motor circuit, except when the car speed is approaching that desired. When these shunt contacts are in engagement, the interrupter contacts are ineffective. When either pair of shunt contacts, however, is out of engagement, the interrupter contacts are effective to cause intermittent operation of the operator which, of course, decreases the rate at which the carburetor is opening or closing, as the case may be.

As diagrammatically shown in Figure 6, rack 204 is indicated as moving in decelerating direction, by reason of the clockwise rotation of shaft 165, and accordingly pinion 203, which meshes with and moves the rack. As shown in Figures 4 and 10, a stud 338 extends through the rack and is suitably secured thereto and has mounted on its left-hand end (see Figure 10) a hub 339 or the like, on which are formed upwardly and downwardly extending cams 340 and 341, respectively (Figure 6). Upper cam 340 is so arranged that as it passes beneath contact arms 326 and 329 it engages a pin 342 to bias arm 326 upwardly and thus cause contacts 327 and 330 to operate. Operation of these contacts breaks the shunt circuit about interrupter contacts 57 and 58 (Figure 14) to effectuate energization of the interrupter circuit. Similarly, lower rack cam 341 (Figure 7) is so arranged that when it passes near the ends of contact arms 332 and 333, it engages a pin 343 secured to arm 332 to bias this arm downwardly and cause separation of contacts 336 and 337. The separation of these contacts effectuates energization of the interrupter circuit during deceleration operation of the operator.

In order for cams 340 and 341 on rack 204 to operate at the proper periods, the above-described shunt contacts, which are controlled by the cams, are adjustable longitudinally of the rack so that they may be coordinated with the speedometer setting and positioned in relation to the speed lever at which it is desired to maintain the car. As noted above with reference to Figure 4, these shunt contacts are mounted on adjustable plate 319, to which wire 35 (Figure 1) is connected. Hence, adjustment of knob 24 to set the speedometer contacts as described above effects adjustment of plate 319 (Figure 5) to a coordinated position wherein the shunt contacts shown in Figures 6 and 7 effectuate the operation of the interrupter circuits as described. The specific operation of the interrupter circuits and their shunt circuits will be described in detail hereinbelow.

With reference to Figure 4, there is a constant clockwise bias on winding drum 316 or clutch element 168, which may be effected in any suitable manner, as by springs or the like (not shown) so as to maintain clutch dogs 175 in constant engagement with pins 174 on clutch element 168, while the clutch elements are engaged, in order that forward and reverse operation of the operator motor 173 may be reflected in the various parts driven thereby. This bias is, however, yieldable open operation of the foot accelerator (not shown) on the floor of the car so that the carburetor may be opened manually and the car speed increased at any desired time by the driver. Thus, if the driver desires to increase his speed above that selected for automatic maintenance and he depresses his accelerator, cable 43, which is connected to the foot accelerator through the carburetor lever, effects counterclockwise rotation of winding drum 316 and also clutch element 168 which is possible because clutch dogs 175 are pivotally mounted as described, so as to ride over clutch pins 174 upon counterclockwise movement of clutch element 168. Depression of the foot accelerator overcomes the clockwise bias on clutch element 168, which permits a spring 352, the opposite ends of which are connected to post 187 and rack 204 to draw the rack to the right, as shown in Figure 4. This results in counterclockwise or winding movement of drum 314 which accordingly maintains cable 43 taut.

When the carburetor throttle is completely closed, cable 43 is unwound from drum 316 so that the initial winding of the cable is about the reduced portion of the drum. This effects an even relatively slow opening of the carburetor so that surplus gasoline is not supplied to the automobile engine during the first part of the acceleration period, so as to prevent wasteful stuffing of the engine with surplus fuel.

Practically all modern cars are equipped with a foot accelerator, actuation of which prescribes a definite and often unnatural posture on the part of the driver from which he cannot readily move without either taking his foot from the accelerator, depressing or releasing it. The distance between the accelerator pedal and the back of the front seat of the car, while adjustable in many cases, is more or less predetermined by the car manufacturer, and this distance is not always suited to the length of the driver's legs. While many car seats are adjustable, their adjustment is provided primarily to permit free movement of the arms with relation to the steering wheel, rather than to accommodate the driver's leg length to the accelerator pedal. Hence, it may be seen that two or three foot pedals 45 may be located where and as desired beneath the steering wheel of the car on the floorboard thereof so as to relieve the unnatural and fatigue-producing attitude which the driver otherwise assumes in operating the foot accelerator.

As described above, hub 178 is movable axially of shaft 165 (Figure 12) this movement being possible by reason of the hub and also winding drum 316 being secured to a sleeve 344 by pins 345 or the like, the sleeve being slidable axially along shaft 165. A friction disc 346 is secured to the left end of shaft 165, as viewed in Figure 12, or to collar 166 as desired so as to rotate therewith, this disc being provided with an annular recess 347 which receives the left-hand end of sleeve 344 when the sleeve and the parts connected thereto are in the position shown. Sleeve 344 has a collar loosely mounted thereon, but the movement of this collar is restricted by pins 349 or the like extending from sleeve 344 into suitable slots 350 in collar 348. A spring 351 is coiled about sleeve 344 and is disposed between winding drum 316 and collar 348 so as to bias the right-hand side of collar 348 against pins 349.

When clutch elements 168 and 169 are disengaged, element 168 tends to rotate rapidly in clockwise direction, as described above, by reason of the bias thereon. This, however, would result in too rapid closing of the carburetor, and it is to the prevention of this that I have provided the parts just described hereinabove. Thus, when clutch element 168 and accordingly sleeve 344 and collar 348 move to the left, this collar is urged against friction disc 346 by spring 351, the friction between the two parts increasing as the left-hand end of the sleeve enters friction disc 346, thus slowing up the rate of rotation of the sleeve and accordingly winding drum 316 and preventing too rapid closing of the carburetor. If desired, the same results can be accomplished by use of a suitable dash-pot arrangement (not shown).

For efficient operation of my control apparatus during travel of the car up and down grade, supplemental acceleration and deceleration controls are preferably provided. When the car is going up grade, the controller is continuously opening the throttle which it continues to do until the engine is developing sufficient power to overcome the grade and maintain the car speed at the desired level. If, however, the speed slightly exceeds the desired value, the mechanism described hereinabove acts to close the throttle and decelerate the car, and it is this deceleration which is desirably controlled by the supplemental mechanism, as it is more rapid by reason of the grade. In other words, it is desirable that the throttle be closed more gradually than it would under level operating conditions so as not to result in such a sudden loss of power as would drop the car speed well below that desired. Similar control of accelerating action of the controller when the car is going down grade is also desirable, as under such circumstances it is undesirable that the throttle be opened as rapidly as it would be under level operating conditions, by reason of the fact that the down grade increases the normal rate of acceleration. To these ends I provide the mechanism now to be described.

With reference to Figure 10, stud 338 on rack 204 also carries an outer hub 353, having formed thereon serrated upper and lower cams 354 and 355 respectively (see also Figure 5). These cams ride between insulating blocks 323 and 325 (Figure 10) the former of which supports a pair of contact arms 356 (Figure 5) and 357. Arm 356 is biased downwardly by a spring 358 and carries on its under side a contact 359 which normally engages a contact 360 supported on the upper side of contact arm 357. The free end of arm 356 has a pin 361 extending downwardly therefrom in the path of upper cam 354.

Similarly, lower insulating block 325 supports a pair of contact arms 362 and 363, the former of which is biased upwardly by a spring 364. A pair of contacts 365 and 366 are mounted respectively on arms 362 and 363, and by reason of the upward bias of arm 362 these contacts are normally in engagement. The free end of arm 362 carries an upwardly extending pin 367, the upper end of which lies in the path of travel of lower cam 355.

As noted above, the upper surface of cam 354 is serrated so that as pin 361 rides over the cam, contacts 359 and 360 are intermittently separated. When these contacts are separated, a shunt circuit, which will be described below, is broken so that the operator operates intermittently. A similar effect is produced when the serrated surface of cam 355 passes over pin 367, to intermittently disengage contacts 365 and 366.

Contacts 359 and 360 may be termed up-grade deceleration shunt contacts, and these contacts are connected to contacts in a pendulum switch generally indicated at 368 (Figures 1 and 3). Contacts 365 and 366 (Figure 5) may be termed down-grade acceleration shunt contacts, and these contacts are also connected to another set of contacts in pendulum switch 368 (Figure 1).

Pendulum switch 368 (Figure 3) includes a suitable housing 369 within which a pendulum 370 is pivoted as at 371. The upper end of arm 370 is pivotally connected to the lower end of an arm 372 which in turn is pivoted in casing 369 as at 373. The upper end of arm 372 has a pair of arcuate supports 374 and 375 secured thereto, and these supports respectively carry contacts 376 and 377. A pair of stationary supports 378 and 379 are mounted in housing 369, and have mounted on the upper ends thereof, respectively, stationary contacts 380 and 381 properly positioned for engagement by contacts 376 or 377 in accordance with the swing of the pendulum. When the car is going uphill, contacts 376 and 380 tend to disengage; contacts 377 and 381 tending to disengage when the car is on a down grade. The former set of contacts are connected to shunt contacts 359 and 360, while the latter set of pendulum contacts are connected to shunt contacts 365 and 366 (Figure 5) as will be more fully described below.

*Operation*

The operation of my automatic control will now be described. Assuming that the driver of the car desires to maintain a speed of 40 miles per hour, for example, he adjusts knob 24 (Figure 1) accordingly, and this adjustment through shaft 25 and cable 35 adjusts respectively the speedometer contacts shown in Figure 17 and plate 319 (Figure 5) to properly position the rack contacts shown in Figures 6 and 7. Main switch 241 (Figure 18) is closed and foot pedal 45 (Figure 1) is depressed to close contact 207 (Figure 18) which is connected through main fuse 240 and switch 241 to the battery 242. Contact 207 is connected by a line 382 to relay fuse 239 which is in turn connected by a line 383 to deceleration stop contact 211 as at a terminal 384. A line 385 connects deceleration stop contact 211 with acceleration stop contact 212, the former stop contact being connected to relay coil 234 by a line 386, and the latter stop contact being connected to relay coil 238 by a line 387. Deceleration relay coil 234 is connected by a line 388 to adjustable deceleration speedometer contact 139 while acceleration relay coil 238 is connected by a line 389 to the adjustable speedometer acceleration contact 133, one or the other of speedometer contacts 133 and 139 being engageable by governor controlled contacts 145 and 146, respectively, depending upon the operative condition of the car.

Contacts 139 and 146 are in engagement when the car speed exceeds that desired, and hence control the operation of motor 173 in closing the throttle. Similarly, speedometer contacts 133 and 145 are in engagement when the car speed is less than that desired to effect energization of motor 173 so as to open the throttle.

It will now appear that two control circuits are provided. The first of these will be hereinafter termed the deceleration control circuit and will be generally referred to as circuit A, this circuit comprising contact 207, line 382, fuse 239, line 383, terminal 384, stop contact 211, line 386, relay coil 234, line 388 and speedometer contacts 139 and 146, the latter of which is grounded. What will hereinafter be termed the acceleration control circuit and generally referred to as circuit B, includes terminal 384, line 385, stop contact 212, line 387, relay coil 238, line 389 and speedometer contacts 133 and 145, the latter of which is grounded.

Deceleration relay coil 234 is connected by a line 390 to stationary relay holding contact 264 which, when circuit A is energized by the closing of contacts 139 and 146, attracts movable relay holding contact 263. Acceleration relay coil 238 is connected by a line 391 to stationary relay holding contact 282 on the other relay adapted to contact with movable relay holding contact 281 upon energization of circuit B. Movable contacts 263 and 281 coact respectively with stationary contacts 257 and 278 which are connected by a line 392 in turn connected to a line 393 which leads to ground.

Thus, when circuit A is energized, contacts 263 and 264 engage to energize a circuit leading from battery 242 through relay coil 234, including line 390, contacts 264 and 263, contacts 280 and 278, lines 392 and 393, to ground. Similarly, energization of circuit B, which results in the closing of contacts 281 and 282 sets up a circuit through relay 238, this circuit including line 391, contacts 282 and 281, contacts 258 and 257 and lines 392 and 393, to ground.

As noted above, deceleration relay coil 234 is part of a relay which also includes one set of contacts 283 and 284, and also a second set of contacts including stationary contacts 308 and 309 and a movable contact 312. When circuit A is energized to close relay holding contacts 263 and 264, relay contacts 283 and 284 also close, and at the same time contact 312 engages contact 309 of the second set of relay operating contacts. The closing of these contacts establishes a circuit in battery 242 as follows: main contact 207, a line 394, a line 395, contacts 284 and 283, a line 396 which is connected to grade control rack contact 359, the other rack contact 360, a line 397, rack contacts 327 and 330, a line 398, relay contacts 296 and 297, motor field 173f, as line 399, relay contacts 312 and 309, a line 400, a line 401, motor armature 173a, to ground. This circuit will hereinafter be termed the deceleration operating circuit, and will be generally referred to as circuit C. Energization of circuit C thus energizes control motor 173 to actuate the operator in a direction to close the carburetor throttle.

The acceleration relay, which includes coil 238 and holding contacts 281 and 282 also includes two other sets of operating contacts, one set including contacts 269 and 270, and the other set including stationary contacts 296 and 302 and movable contacts 301 and 297, which cooperate with the stationary contacts. Upon energization of acceleration relay coil 238, movable contact 301 and stationary contact 302 engage. This energization of the acceleration relay coil and resultant closing of holding contacts 281 and 282 establishes what will hereinafter be termed the acceleration operating circuit, which circuit will be referred to as operating circuit D. Circuit D accordingly includes battery 242, line 394, relay contacts 270 and 269, a line 402, grade control rack contacts 365, 366, a line 403, rack controlled shunt contacts 336 and 337, a line 404, relay contacts 308 and 311, line 399, motor field 173f, contacts 301 and 302, line 401, motor armature 173a to ground. It will be seen from the description of circuit D, that the flow of current through motor 173 is reversed so as to effect acceleration operation of the operator to open the throttle. It will also be seen that operating circuits C and D are energized in accordance with the position of speedometer contacts 145 and 146 in relation respectively to control contacts 133 and 139 of control circuits B and A. The spacing between the speedometer contacts is such that but a slight variation in car speed effects energization of that one of the controlling circuits A and B necessary to rectify the variation of car speed from that desired. Hence, energization of control circuit A, which results from excessive car speed, energizes operating circuit C to effect operation of the operator in throttle closing direction. Reduction of car speed below that desired results in energization of control circuit B and deenergization of operating circuit A, thus causing operation of the operator in the opposite direction to open the throttle.

Inasmuch as speedometer contacts 139 and 146 or speedometer contacts 133 and 145 break before their corresponding relay holding contacts 263, 264 or 281, 282, there is no arcing at the speedometer contacts. To prevent arcing of relay contacts 283 and 284 in circuit C, a condenser 405 is connected across these contacts. Similarly, to prevent arcing of relay operating contacts 269 and 270 in circuit D, a condenser 406 is connected across these latter contacts. Adjustment of contacts on the deceleration relay is made so that contacts 283 and 284 open before contacts 309 and 312. Thus, the condenser 405 protects the contacts which actually interrupt the motor current in circuit C for the same purpose relay operating contacts 269 and 270 in circuit D are adjusted to open before contacts 301 and 302.

As hereinbefore noted, when the speed of the car approaches the desired selected rate, it is desirable to effect intermittent operation of controller motor 173 so as not to overshoot or undershoot the desired speed. It will be recalled that the speedometer device shown in Figures 13 and 14 includes interrupter contacts 57 and 58, which intermittently engage stationary contacts 60, 61 and 69, 70 (Figure 18) respectively connected to circuits D and C. These interrupter contacts are ineffective during the major portion of the acceleration and deceleration periods, and are shunted out of circuits C and D by two different sets of shunt contacts operated by the speedometer and rack 204 (Figures 6 and 7) respectively. As it is desirable that current be steadily supplied to the motor 173 during the major portion of the acceleration and deceleration periods interrupter shunt contacts 156, 157, 158 and 159 (lower left-hand portion of Figure 18) are provided as hereinbefore described. Shunt contacts 156 and 157 engage respectively contacts 131 and 132 during acceleration of the car being forced thereagainst by reason of the bias of the spring on the speedometer shaft hereinabove described, which is tensioned by the setting of the speedometer arm 111 at the speed to be maintained also described above. This bias, of course, effects the engagement between the movable contacts and the stationary contacts, until the speedometer governor has attained such speed as is sufficient to relieve the bias of the spring. As the clearance between speedometer contacts 145, 146 and contacts 133 and 139 is on the order of .006 of an inch, and as the clearance between contacts 156, 157 and 131, 132, for example, is on the order of $\frac{3}{32}$ of an inch, the latter set of contacts breaks before the former, thus breaking the shunt circuit to permit intermittent operation of the interrupter contacts. Interrupter shunt contacts 131 and 132 are connected respectively to lines 407 and 408 which are in turn respectively connected to terminals 409 and 410. Terminal 409 is connected by a line 411 to line 404 and terminal 410 is connected as described above to line 402, by way of line 403 and contacts 366 and 365. Thus the circuit which includes terminals 409 and 410 comprises a shunt circuit which bypasses interrupter contacts 57, 58 and 60, 61. It should also be noted that condenser 406 is also connected across these interrupter contacts and thus prevents excessive arcing thereof.

As hereinbefore noted, another shunt circuit for these interrupter contacts is provided, this latter shunt circuit including rack contacts 336 and 337, the former of which is movable by means of cam 341 on the operator rack 204. Cam 341 engages contact 336 at a point near to that point of the rack's travel at which the desired throttle opening is attained so that the shunt circuit which by-passes the interrupter is broken. This latter shunt circuit, i. e., the one controlled by rack contacts 336 and 337 is provided primarily to preclude overshooting of the desired speed while the car is operating on the level. Breaking of rack contacts 336 and 337 is, however, ineffective to break the shunt circuit if there is a continued demand for power, by reason of an upgrade. Under such circumstances, the tendency is toward decrease in car speed, which results, of course, in the engagement of speedometer contacts 156 and 157 with stationary contacts 131 and 132, thus establishing the shunt circuit around the interrupters 57, 58, 60, 61, regardless of the position of rack contacts 336 and 337.

Similar shunt circuits are provided for interrupter contacts 57, 58 and 69, 70 (lower right-hand corner of Figure 18) which by-pass the interrupter during deceleration of the car.

As shown in the lower left-hand corner of Figure 18, speedometer contacts 158 and 159 engage respectively stationary contacts 137 and 138 during deceleration. Stationary contacts 137 and 138 are connected respectively to lines 412 and 413, in turn respectively connected to terminals 414 and 415. Terminal 414 is connected to line 396 by way of line 397 and rack contacts 359, 360, terminal 415 being connected to line 398. Thus a shunt circuit is provided, which bypasses interrupter contacts 57, 58 and 69, 70, across which condenser 405 is connected to prevent excessive arcing. As in the case of the acceleration shunt circuits, there is a second deceleration shunt for interrupter contacts 57, 58 and 69, 70, this latter shunt circuit including contacts 327 and 330, the former of which is movable by rack cam 340 which engages the contact at a point near to that point of the rack's travel at which the desired throttle setting is attained so that the shunt circuit which bypasses the interrupter contact is broken. Here again this shunt circuit, i. e., the one controlled by rack contacts 327 and 330 is provided primarily for level travel of the car. It should also be noted that separation of contacts 327 and 330 is ineffective to break the shunt circuit if there is no demand for power by reason of a down grade. Under such circumstances the tendency is for the car speed to increase which, of course, results in the engagement of speedometer contacts 158 and 159 with contacts 137 and 138 thus establishing the shunt circuit around the interrupter regardless of the position of rack contacts 327 and 330.

It will now appear that operating circuits C and D are energized continuously as long as full deceleration or acceleration is necessary, as where the car is going down or up hill, these circuits being energized intermittently only when the desired car speed is approached.

As hereinbefore briefly noted, supplemental acceleration and deceleration controls are necessary for efficient operation of the speed controller during travel of the car up and down grade. When the car is going up grade, for example, the controller is continuously opening the throttle, which it continues to do until the engine is developing sufficient power to overcome the grade and maintain the car speed at the desired value. If, however, the speed slightly exceeds the desired value, the controller of course acts to close the throttle, i. e., decelerate the car and it is this deceleration which must be controlled. In other words, the decelerating action of controller rack 204 (Figure 6) is desirably interrupted so that the closing of the throttle will be gradual and will not result in such a sudden loss of power as will pull the car speed well below that desired.

To this end pendulum controlled contacts 376, 380 and 377, 381 (Figures 3 and 18) are provided, the former pair of which tend to separate when the car is going up grade and the latter pair of which separate when the car is going down hill. Pendulum contacts 376, 380 are connected to rack contacts 359 and 360, as shown in the lower right-hand portion of Figure 18, and with lines 396 and 397 connect line 396 of operating circuit C to the operator motor. Thus, when the car is going up hill and it is desired to control the rate of closing movement of the throttle, in the event the car speed exceeds that desired so as to avoid too rapid deceleration, pendulum contacts 376 and 380 are out of engagement, but lines 396 and 397 are connected by rack contacts 359 and 360 until rack cam 355 acts on movable contact 359. When this occurs, engagement between rack contacts 359 and 360 is intermittent, and thus the bypass around interrupter contacts 57, 58 and 69, 70 is intermittently broken. If the bypass circuit is broken while the interrupter contacts are separated, the operator motor is, of course, deenergized and does not act to close the throttle and will not again be energized until either the interrupter contacts close or the rack contacts 359 and 360 engage, by reason of the former riding into a notch on the serrated cam 354. Hence, the rate of decelerating operation of the operator is slowed down and accordingly the rate at which the throttle is closed is lessened to avoid over-deceleration as would otherwise result from the car speed dropping well below that desired.

As pointed out above, rack contacts 359 and 360 (Figure 5) are also mounted on adjustable plate 319, and hence are moved into the critical range when knob 24 (Figure 1) is set.

Down grade pendulum contacts 377 and 381 (Figures 3 and 18) which prevent over-acceleration, work in substantially the same manner as the deceleration control contacts just described to prevent excessive opening of the throttle by the operator when the car speed during down grade travel falls below the desired level. Thus, while going down grade, acceleration control contacts 377 and 381 (upper right-hand portion of Figure 18) are separated so that the by-pass circuit around interrupter contacts 57, 58 and 60, 61 is completed only through rack contacts 365 and 366. The former of these contacts, however, is under the control of serrated rack cam 355, which intermittently moves this contact out of engagement with contact 366. When this happens, the by-pass around the interrupter contacts is broken, and as these interrupter contacts are separated, the operator motor is deenergized, which precludes further opening of the throttle. It accordingly may be seen that excessive acceleration during down grade travel at the critical speed is precluded and thus prevents such acceleration as would increase the car speed well above that desired.

As shown in Figure 1, a set of indicator lights 416, 417 and 418 is preferably provided. Light 417 is connected by a line 420 to battery 242 through main contact 207 and accordingly upon closing of main switch 241 and closing of the main contact, is lit to indicate that the operator is energized. Light 416 (lower right-hand portion of Figure 18) is connected by a line 421 to line 396 of operating circuit C so that when this circuit, which is the deceleration circuit, is energized, light 416 is lit to indicate this condition. Light 418 is connected by a line 422 to line 402 of operating circuit D which is the acceleration circuit, and hence energization of this circuit is indicated by light 418. Thus the driver of the car can determine at a glance whether the operator is running and whether it is running in throttle closing or opening direction.

Under certain conditions of operation of the car, it may be desirable that the car speed be decreased and maintained at such decreased value without, however, changing the setting of knob 24 (Figure 1). For example, if the driver is operating at 40 miles per hour and approaches an area at which the speed limit is 25 miles per hour, it is desirable to attain the lower speed and maintain it without changing the setting of the operator. To this end, as is shown in Figure 1, foot pedal 45, which includes a button and plunger 45a, has formed in the latter a notch 423 which engages a movable detent or the like (not shown) when the driver slightly releases his foot pressure on the foot pedal. By so doing, and with reference to Figure 4, main contact 207 is broken, thus totally deenergizing operator motor 173; but clutch elements 168 and 169 are not disengaged, so that the throttle setting is maintained. If the driver of the car then takes his foot completely off the pedal 45 (Figure 1) the clutch elements 168 and 169 (Figure 4) completely disengage, under which circumstances the throttle tends to close. If shortly thereafter the car driver again depresses pedal 45, but only to the point where notch 423 engages its detent (not shown) and does so before the throttle is completely closed, the car speed will tend to remain at the lower level, corresponding to the decreased throttle opening. Of course, complete depression of foot pedal 45 (Figure 1) by the car driver will again close main contact 207 (Figure 4) resulting in normal operation of the operator to increase the car speed to the level desired.

As hereinbefore noted, cable 23 which connects speedometer 22 with the stepped up gearing (not shown) is flexible. Cable of this character is, of course, available in various diameters and its construction may consist of from four to eleven wires in coil spring shape, each one of which is wound over the other in clockwise and counter-clockwise direction so as to form a cable which will have the least amount of torque. These various sized cables therefore afford a selection of one to be used which will maintain an even pull or rotation on any mechanism which is attached to the power takeoff end of the cable. It should also be noted that a speedometer cable such as cable 23 when installed in a car takes a number of turns and twists between the transmission and the speedometer. Hence the speedometer has a constant normal pull on the cable which renders the torque fairly constant. However, when arm 111 (Figure 16) of speedometer 22 contacts with either of blocks 124 or 125, the stopping of arm 111 in its rotation results in a torque on the speedometer cable which in turn normally and to a slight degree causes the cable momentarily to wind up and thereby effect oscillation of governor weights 83—86 (Figure 14) which might cause arm 111 to make and break contact. I have taken advantage of this condition to obtain further micrometer adjustment resulting in maintaining a proper car speed with the speedometer setting. As pointed out above, springs 101 and 104 (Figure 15) are adjustable as to their tension or bias. This adjustability is utilized to intensify or diminish the rebound of the governor weights 83—86 (Figure 14) and the torque in cable 23, so that arm 111 will cause one or the other of its front contacts 145 or 146 to hold closed when the car acceleration results in a speed excessive of that desired. Hence, through the adjustability of springs 101 and 104, and in view of the characteristics of the governor performance and the torque in the speedometer cable, it will be seen that governor oscillation and torque in the cable can be controlled to vary the rapidity of contacts to get the desired results, thereby affording micrometer adjustment so that the car will hold its predetermined speed on level, but when approaching a hill or descending a hill a slight difference in speed will cause intermittent making and breaking of the contacts on arm 111 because of the excessive pressure on arm 111 resulting from the predetermined tensioning of springs 101 and 104.

Viewed in another light, springs 101 and 104 can be set so that the rebound of the governor weights 83—86 will only affect the front contacts 145 and 146 on arm 111 (Figure 16) under which circumstances, the rear contacts on this arm are not made until the speed of the car decreases from that desired by approximately one mile per hour either way over which the setting of the contacts has been made. Thus the resistance of arm 111 as against the tendency of the governor weights to break the contacts is sufficient to hold arm 111 against the contacts in blocks 124 and 125 so as to maintain a steady torque on flexible shaft 23 (Figure 14) for governor weights 83—86.

While I have described the construction and operation of my automatic control apparatus as applied to an automobile, I do not wish to be limited to this application of the apparatus, as it will operate with equal facility and efficiency in maintaining a sea-going vessel or an aeroplane on its course. Other practical applications of my apparatus will also be readily apparent where it is desired to maintain an operative condition or the like at a predetermined value, without substantial fluctuation.

Accordingly, I have provided a method and apparatus for controlling a condition of operation of a vehicle or the like which attains the various objects hereinabove set forth in a thoroughly practical and efficient manner.

As many possible embodiments may be made of the mechanical features of the above invention and as the art herein described might be varied in various parts, all without departing from the scope of the invention, it is to be understood that all matter hereinbefore set forth or shown in the accompanying drawings is to be interpreted as illustrative and not in a limiting sense.

I claim:

1. In apparatus for maintaining a variable condition at a substantially constant predetermined value, in combination, means responsive to variations in said condition, means for varying said condition, means for driving said condition varying means, means responsive to said first-mentioned means for effecting operation of said driving means, and means operated by said second means for effecting intermittent operation of said driving means only as said condition approaches its predetermined value.

2. In apparatus for maintaining a variable condition at a substantially constant predetermined value, in combination, means responsive to variations in said condition, means for varying said condition, means for driving said condition varying means, means responsive to said first-mentioned means for effecting operation of said driving means, means for effecting intermittent operation of said driving means as said condition approaches its predetermined value, and shunt means for holding said last-mentioned means out of operation until said condition approaches its predetermined value.

3. A device for controlling the operative condition of a carburetor throttle valve or the like comprising, in combination, a rotatable shaft, a pair of clutch elements mounted on said shaft, one of said elements being secured to said shaft to rotate therewith, the other of said elements being rotatable relative to said shaft when disengaged from said first element, a reversible electric motor for driving said first-mentioned element, manually operable means for engaging said elements and for effecting at the same time energization of said motor, whereby said shaft is rotated, means operated by said shaft for intermittently interrupting the operation of said motor at a predetermined selective portion of the total period of rotation of said shaft in either direction of rotation thereof, and means operated by said last-mentioned clutch element for closing or opening said valve in accordance with the direction of rotation of said shaft.

4. A device for controlling the operative condition of a carburetor throttle valve or the like comprising, in combination, a rotatable shaft, a pair of clutch elements mounted on said shaft, one of said elements being secured to said shaft to rotate therewith, the other of said elements being movable axially of said shaft and rotatable relative thereto when disengaged from said first element, means adapted to be manually operated for effecting engagement of said clutch elements, an electric motor for driving said first-mentioned element, a switch operated by said last-mentioned means for effecting energization of said motor upon manual operation of said last-mentioned means, and means operated by said last-mentioned clutch element for controlling said valve.

5. A device for controlling the operative condition of a carburetor throttle valve or the like comprising, in combination, a rotatable shaft, a pair of clutch elements mounted on said shaft, one of said elements being secured to said shaft to rotate therewith, the other of said elements being movable axially of said shaft and rotatable relative thereto when disengaged from said first element, means adapted to be manually operated for effecting engagement of said clutch elements, an electric motor for driving said first-mentioned element, a switch operated by said last-mentioned means for effecting energization of said motor upon manual operation of said last-mentioned means, means for biasing said last-mentioned means in a direction to disengage said elements, and means operated by said last-mentioned clutch element for controlling said valve.

6. A device for controlling the operative condition of a carburetor throttle valve or the like comprising, in combination, a rotatable shaft, means for rotating said shaft, means operatively associated with said shaft for intermittently interrupting the operation of said means, means for adjusting said last-mentioned means to effect said intermittent interruption at a predetermined period in the rotation of said shaft, means operated by said shaft for controlling the operative condition of said valve, and means operated by said second-mentioned means at a predetermined point in its travel for deenergizing said shaft rotating means.

7. A device for controlling the operative condition of a carburetor or the like comprising, in combination, a rotatable shaft, a reversible electric motor for driving said shaft, a gear on said shaft, a rack meshing with said gear and reciprocable relative to said shaft upon rotation thereof, means operated by said rack for intermittently deenergizing said motor during a portion of the travel of said rack, and means operated by said rack for deenergizing said motor at predetermined periods in each direction of operation thereof.

8. A device for controlling the operative condition of a carburetor throttle valve or the like, comprising in combination, a rotatable shaft, a clutch element connected to said shaft, a motor operatively connected to said clutch element for rotating said shaft, a second clutch element rotatably mounted on said shaft, said second clutch element also being mounted on said shaft for axial movement relative thereto, means for engaging said clutch elements to effect rotation of said second element when the first is driven, friction means associated with said shaft for braking free rotation thereof when said clutch elements are disengaged, and means operated by said second clutch element for controlling said valve.

9. A device for controlling the operative condition of a carburetor throttle valve or the like, comprising in combination, a rotatable shaft, an electric motor, a clutch element secured to said shaft adapted to be driven by said motor, a second clutch element rotatably mounted on said shaft and adapted to be driven by said first clutch element when engaged therewith, means for engaging said clutch elements, a winding drum connected to said second clutch element, and a cable connected to said winding drum and to said throttle valve for operating said valve upon engagement of said clutch elements.

10. A device for controlling the operative condition of a carburetor throttle valve or the like, comprising in combination, a rotatable shaft, an electric motor, a clutch element secured to said shaft adapted to be driven by said motor, a second clutch element rotatably mounted on said shaft and adapted to be driven by said first clutch element when engaged therewith, means for engaging said clutch elements, a winding drum connected to said second clutch element, a cable connected to said winding drum and to said throttle valve for operating said valve upon engagement of said clutch elements, and means for braking free rotation of said second clutch element and winding drum upon disengagement of said clutch elements.

11. A device for controlling the operative condition of a carburetor throttle valve or the like, comprising in combination, a rotatable shaft, an electric motor, a clutch element secured to said shaft adapted to be driven by said motor, a second clutch element rotatably mounted on said shaft and adapted to be driven by said first clutch element when engaged therewith, means for engaging said clutch elements, a winding drum connected to said second clutch element, a cable connected to said winding drum and to said throttle valve for operating said valve upon engagement of said clutch elements, and means disassociated from said motor for rotating said second clutch element and winding drum when said clutch elements are disengaged.

12. A device for controlling the operative condition of a carburetor throttle valve or the like, comprising in combination, a rotatable shaft, an electric motor, a clutch element secured to said shaft adapted to be driven by said motor, a second clutch element rotatably mounted on said shaft and adapted to be driven by said first clutch element when engaged therewith, means for engaging said clutch elements, a winding drum connected to said second clutch element, a cable connected to said winding drum and to said throttle valve for operating said valve upon engagement of said clutch elements, means disassociated from said motor for rotating said second clutch element and winding drum when said clutch elements are disengaged, and means for braking free rotation of said second clutch element and said winding drum upon disengagement of said clutch elements.

13. A device for controlling the operative condition of a carburetor throttle valve or the like, comprising in combination, a rotatable shaft, an electric motor, a clutch element secured to said shaft adapted to be driven by said motor, a second clutch element rotatably mounted on said shaft and adapted to be driven by said first clutch element when engaged therewith, means for engaging said clutch elements, a winding drum connected to said second clutch element, and a cable connected to said winding drum and to said throttle valve for operating said valve upon engagement of said clutch elements, said winding drum including an enlarged portion to effect accelerated operation of said throttle valve during one portion of the winding operation of said drum.

14. A device for controlling the operative condition of a carburetor or the like comprising, in combination, a rotatable shaft, a reversible electric motor for driving said shaft, a gear on said shaft, a rack meshing with said gear and reciprocable relative to said shaft upon rotation thereof, means operated by said rack for intermittently deenergizing said motor during a portion of the travel of said rack, and means for varying the operative position of said deenergizing means to control the period of intermittent motor operation.

15. In a device for maintaining an operative condition of a vehicle or the like at a predetermined value, the combination of means including a governor adapted to be driven by said vehicle during operation thereof, means for controlling the operative condition of said vehicle, an operator for controlling said controlling means, a reversible electric motor for driving said operator, a pair of circuits including a source of current connected to said motor, a switch in each of said circuits, a relay operatively associated with each of said switches and adapted when energized to close said switches, a circuit for each of said relays connected to said source of current, each of said last-mentioned circuits including a stationary contact, a movable contact associated with said stationary contacts and adapted to engage one or the other thereof to complete the circuit of the engaged contact, and means operated by said governor for moving said movable contact.

16. In a device for maintaining an operative condition of a vehicle or the like at a predetermined value, the combination of, means including a governor adapted to be driven by said vehicle during operation thereof, means for controlling the operative condition of said vehicle, an operator including a manually engageable clutch for controlling said controlling means, a reversible electric motor for driving said operator, a pair of circuits including a source of current connected to said motor, a switch in each of said circuits, a relay operatively associated with each of said switches and adapted when energized to close said switches, a circuit for each of said relays connected to said source of current, each of said last-mentioned circuits including a normally stationary contact, means for selectively positioning said last-mentioned contacts in accordance with the velocity desired to be maintained, a movable contact operable to engage one or the other of said normally stationary contacts, and means operated by said governor means for operating said movable contact.

17. In a device for maintaining an operative condition of a vehicle or the like at a predetermined value, the combination of, means for controlling the operative condition of said vehicle, an operator for controlling said controlling means, a reversible electric motor for driving said operator, a pair of circuits including a source of current for effecting operation of said motor in one direction or the other, a stationary contact associated with each of said circuits, a movable contact operatively related to said stationary contacts and engageable with one or the other thereof, means driven by said vehicle during operation thereof for effecting engagement between said movable contact and one or the other of said stationary contacts depending upon the operative condition of the vehicle with relation to a predetermined operative condition, and means associated with said operator and actuated thereby to intermittently make and break that one of said circuits which is energizing said motor as the value of the operative condition of the vehicle approaches that predetermined.

18. In a device for maintaining an operative condition of a vehicle or the like at a predetermined value, the combination of, means for controlling the operative condition of said vehicle, an operator for controlling said controlling means, a reversible electric motor for driving said operator, a pair of circuits including a source of current for effecting operation of said motor in one direction or the other, a stationary contact associated wtih each of said circuits, a movable contact operatively related to said stationary contacts and engageable with one or the other thereof, means driven by said vehicle during operation thereof for effecting engagement between said movable contact and one or the other of said stationary contacts depending upon the value of said operative condition of the vehicle with relation to that predetermined, and means operated by said last-mentioned means for intermittently deenergizing said motor as the value of the operative condition of the vehicle approaches that predetermined.

19. A controller for maintaining the velocity of a vehicle at a predetermined selected rate, said vehicle including a propeller shaft or the like, in combination, a governor operatively connected to said propeller shaft for operation thereby, switch means including movable contacts and normally stationary contacts, means forming a driving connection between said governor and said movable contacts whereby variation in the veloctiy of the vehicle effects variation in the position of said movable contacts relative to said stationary contacts, means for adjusting said stationary contacts in accordance with the velocity to be maintained, a pair of control circuits including a source of current connected to said stationary contacts and individually energizable depending upon which of said stationary contacts is engaged by said movable contacts, a pair of operating circuits, each of said operating circuits being operatively related to one of said control circuits and energizable thereby upon energization of the control circuits, a reversible electric motor connected to said operating circuits and adapted to operate upon energization of one or the other thereof, an operator including a clutch connected to and adapted to be driven by said motor upon engagement of said clutch, and a velocity controlling device mounted on said vehicle and adapted to be operated by said operator.

20. A controller for maintaining the velocity of a vehicle at a predetermined selected rate, said vehicle including a propeller shaft or the like, in combination, a speedometer device operatively connected to said propeller shaft for operation thereby, a pair of control circuits associated with said speedometer device, one of said circuits being adapted to be energized when the velocity exceeds that selected, the other of said control circuits being adapted to be energized when the velocity is less than that selected, a relay associated with each of said circuits and energizable therewith, a pair of operating circuits each having a switch associated with one of said relays and adapted to be closed to effect energization of its circuit upon energization of its relay, a reversible electric motor connected to said operating circuits and adapted to operate upon energization of one or the other, an operator connected to and adapted to be driven by said motor, a velocity controlling device mounted on said vehicle and adapted to be operated by said operator, and means for decreasing the rate of operation of said operator as the selected velocity is approached.

21. A controller for maintaining the velocity of a vehicle at a predetermined selected rate, said vehicle including a propeller shaft or the like, in combination, a speedometer device operatively connected to said propeller shaft for operation thereby, a pair of control circuits associated with said speedometer device, one of said circuits being adapted to be energized when the velocity exceeds that selected, the other of said control circuits being adapted to be energized when the velocity is less than that selected, a relay associated with each of said circuits and energizable therewith, a pair of operating circuits each having a switch associated with one of said relays and adapted to be closed to effect energization of its circuit upon energization of its relay, a reversible electric motor connected to said operating circuits and adapted to operate upon energization of one or the other, an operator connected to and adapted to be driven by said motor, a velocity controlling device mounted on said vehicle and adapted to be operated by said operator, and means associated with said speedometer device for intermittently deenergizing said operating circuits to effect intermittent operation of said motor as the desired velocity is approached.

22. A controller for maintaining the velocity of a vehicle at a predetermined selected rate, said vehicle including a propeller shaft or the like, in combination, a speedometer device operatively connected to said propeller shaft for operation thereby, a pair of control circuits associated with said speedometer device, one of said circuits being adapted to be energized when the velocity exceeds that selected, the other of said control circuits being adapted to be energized when the velocity is less than that selected, a relay associated with each of said circuits and energizable therewith, a pair of operating circuits each having a switch associated with one of said relays and adapted to be closed to effect energization of its circuit upon energization of its relay, a reversible electric motor connected to said operating circuits and adapted to operate upon energization of one or the other, an operator connected to and adapted to be driven by said motor, a velocity controlling device mounted on said vehicle and adapted to be operated by said operator, means associated with said speedometer device for intermittently deenergizing said operating circuits to effect intermittent operation of said motor as the desired velocity is approached, and a shunt circuit for each of said operating circuits adapted to be energized during acceleration and deceleration to mitigate the effect of said last-mentioned means except when the velocity of the vehicle nears that desired to be maintained.

23. A controller for maintaining the velocity of a vehicle at a predetermined selected rate, said vehicle including a propeller shaft or the like, in combination, a speedometer device operatively connected to said propeller shaft for operation thereby, a pair of control circuits associated with said speedometer device, one of said circuits being adapted to be energized when the velocity exceeds that selected, the other of said control circuits being adapted to be energized when the velocity is less than that selected, a relay associated with each of said circuits and energizable therewith, a pair of operating circuits each having a switch associated with one of said relays and adapted to be closed to effect energization of its circuit upon energization of its relay, a reversible electric motor connected to said operating circuits and adapted to operate upon energization of one or the other, an operator connected to and adapted to be driven by said motor, a velocity controlling device mounted on said vehicle and adapted to be operated by said operator, means associated with said speedometer device for intermittently deenergizing said operating circuits to effect intermittent operation of said motor as the desired velocity is approached, a shunt circuit for each of said operating circuits adapted to be energized during acceleration and deceleration to mitigate the effect of said last-mentioned means except when the velocity of the vehicle nears that desired to be maintained, and means associated with each of said operating circuits and operated by said operator for effectuating said last-mentioned means as the vehicle approaches that desired.

24. A controller for maintaining the velocity of a vehicle at a predetermined selected rate, said vehicle including a propeller shaft or the like, in combination, a speedometer device operatively connected to said propeller shaft for operation thereby, a pair of control circuits associated with said speedometer device, one of said circuits being adapted to be energized when the velocity is more than that selected, the other of said control circuits being adapted to be energized when the velocity is less than that selected, a relay associated with each of said circuits and energizable therewith, a pair of operating circuits each having a switch associated with one of said relays and adapted to be closed to effect energization of its circuit upon energization of its relay, a reversible electric motor connected to said operating circuits and adapted to operate upon energization of one or the other, an operator connected to and adapted to be driven by said motor, a velocity controlling device mounted on said vehicle and adapted to be operated by said operator, means for intermittently deenergizing said operating circuits to effect intermittent operation of said motor, means including a shunt circuit for each of said operating circuits and adapted to shunt said deenergizing means, and means responsive to inclined attitudes of said vehicle for breaking said shunt circuits whereby said intermittent deenergizing means is effectuated.

HARRY SAYRE BENJAMIN.